United States Patent
Evans et al.

(10) Patent No.: US 9,250,356 B2
(45) Date of Patent: Feb. 2, 2016

(54) PHOTOCHROMIC POLYMERS

(75) Inventors: Richard Alexander Evans, Glen Waverley (AU); Nino Malic, Ferntree Gully (AU); Ian John Dagley, Lower Templestowe (AU)

(73) Assignee: Vivimed Labs Europe Ltd, Huddersfield (GB)

( * ) Notice: Subject to any disclaimer, the term of this patent is extended or adjusted under 35 U.S.C. 154(b) by 0 days.

(21) Appl. No.: 14/112,232

(22) PCT Filed: May 21, 2012

(86) PCT No.: PCT/AU2012/000563
§ 371 (c)(1),
(2), (4) Date: Oct. 16, 2013

(87) PCT Pub. No.: WO2012/162725
PCT Pub. Date: Dec. 6, 2012

(65) Prior Publication Data
US 2014/0027684 A1     Jan. 30, 2014

Related U.S. Application Data

(60) Provisional application No. 61/492,831, filed on Jun. 3, 2011.

(51) Int. Cl.
| | | |
|---|---|---|
| G02B 1/04 | (2006.01) |
| C08G 63/16 | (2006.01) |
| C08G 63/685 | (2006.01) |
| C08G 63/08 | (2006.01) |
| C08G 63/12 | (2006.01) |
| C08L 67/00 | (2006.01) |
| C09K 9/02 | (2006.01) |
| G02B 5/23 | (2006.01) |

(52) U.S. Cl.
CPC ............... *G02B 1/041* (2013.01); *C08G 63/08* (2013.01); *C08G 63/12* (2013.01); *C08G 63/16* (2013.01); *C08G 63/685* (2013.01); *C08G 63/6854* (2013.01); *C08L 67/00* (2013.01); *C09K 9/02* (2013.01); *G02B 1/04* (2013.01); *G02B 1/043* (2013.01); *G02B 5/23* (2013.01); *C09K 2211/1466* (2013.01); *C09K 2211/1475* (2013.01)

(58) Field of Classification Search
CPC ........ C08G 63/08; C08G 63/12; C08G 63/16; C08G 63/685; G02B 1/04; G02B 1/041; G02B 1/043
See application file for complete search history.

(56) References Cited

U.S. PATENT DOCUMENTS

| | | | |
|---|---|---|---|
| 4,892,923 A | 1/1990 | Weaver et al. | |
| 2008/0225400 A1 | 9/2008 | Swarup et al. | |
| 2012/0136148 A1* | 5/2012 | Lu et al. .................. | 544/79 |

FOREIGN PATENT DOCUMENTS

| | | |
|---|---|---|
| WO | 20050105874 A1 | 11/2005 |
| WO | 2006/080647 A1 | 8/2006 |
| WO | 2009121148 A1 | 10/2009 |
| WO | 2009146509 A1 | 12/2009 |

OTHER PUBLICATIONS

Liu et al., "Approach to Peptide Decorated Micelles via RAFT Polymerization," Journal of Polymer Science: Part A: Polymer Chemistry 47:899-912 (2009).
PCT International Search Report for PCT/AU2012000563, filed May 21, 2012 (mailed Aug. 10, 2012).

* cited by examiner

*Primary Examiner* — Michael L Leonard
(74) *Attorney, Agent, or Firm* — LeClairRyan, a Professional Corporation

(57) ABSTRACT

A photochromic polymer comprising at least two photochromic moieties linked by a straight or branched chain polymer selected from the group consisting of a homo-polyester, a co-polyester, and a co-polyester-polyether.

20 Claims, 1 Drawing Sheet

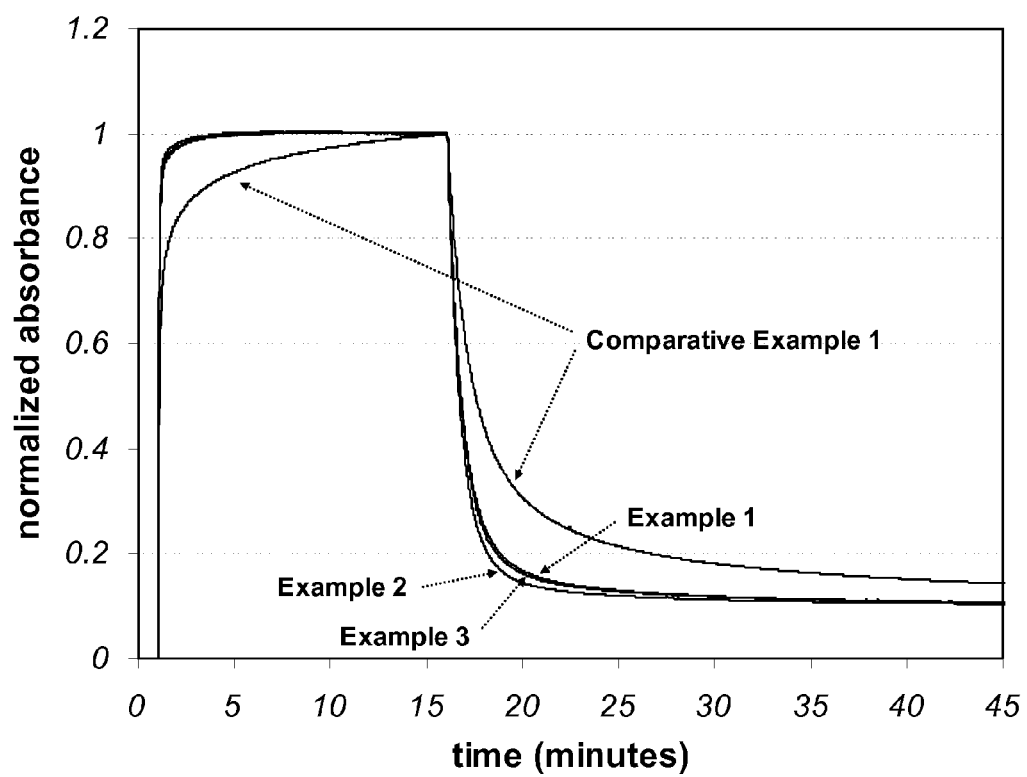

PHOTOCHROMIC POLYMERS

This application is a national stage application under 35 U.S.C. §371 of PCT Application No. PCT/AU2012/000563, filed May 21, 2012, which claims the priority benefit of U.S. Provisional Patent Application Ser. No. 61/492,831, filed Jun. 3, 2011.

This Application claims priority from U.S. Provisional Patent Application No. 61/492,831, the contents of which are herein incorporated by reference.

FIELD

The invention relates to a photochromic polymer and in particular to a linear or branched polymer comprising a polyester polymer linking at least two photochromic moieties, and to polymeric compositions comprising a host polymer and the photochromic polymer, and to methods of preparing the photochromic polymer and polymeric compositions comprising the photochromic polymer.

BACKGROUND

Photochromism is a property which has been used in the manufacture of light transmissible articles for many years. A compound is said to be photochromic if it changes colour when irradiated and reverts to its original colour when irradiation ceases. The use of photochromics in the manufacture of spectacle lenses is a particular benefit as it enables the efficiency with which radiation is filtered to be varied with the intensity of radiation. Photochromics also have potential for use in a range of other polymeric compositions in products or in applications such as architectural, automotive and aircraft windows and transparencies; inks, paints and coating compositions; optical sensors, filters, switches and data storage devices; and for security and UV exposure sensing applications.

Despite the successful use of photochromic compounds in applications such as lenses there remain limitations which reduce the versatility and potential of this technology. It is advantageous to control the rate at which photochromic polymeric compositions transform to their coloured state when exposed to radiation and fade to clear on cessation of this exposure. In many situations, it is important to provide rapid colouring and fading kinetics particularly for lenses and spectacles. In the past a compromise had to be made in the components and properties of the substrate to enhance the rate of coloration and fade. For example, many photochromics colour and fade more rapidly in soft materials and yet, for applications such as spectacles, abrasion resistance and hardness are important. This trade off between rate of transformation and hardness produces a dilemma for manufacturers between toughness and photochromic efficiency. In polymeric lenses many photochromics exhibit a slower rate of fade than is desirable.

International Application WO2004/041961 describes photochromic adducts which comprise a photochromic moiety and one or more polyether or siloxane oligomers. The presence of the oligomers can significantly improve the rate of coloration and fade particularly in the case of polydialkylsiloxane oligomers. International patent application WO 2009/146509 discloses photochromic polymers which include two or more photochromic moieties linked via a polydialkylsiloxane chain. The polydialkylsiloxane adducts containing a single photochromic show a propensity to phase separate with increased loading in host polymers used for lens materials. Phase separation is reduced for siloxanes substituted with two or more photochromic moieties but we have found that the propensity for phase separation may still be a problem at high loadings. Another problem we have found with siloxane photochromic polymers is their susceptibility to acid degradation which requires special synthetic approaches which are less attractive for industrial manufacture.

SUMMARY

We have now found that the fade speed of photochromic polymers comprising two or more photochromic moieties linked by a linear or branched polymer comprising a polyester polymer have good photochromic performance, compatibility, stability and ease of synthesis.

There is provided a photochromic polymer comprising at least two photochromic moieties linked by a straight or branched polyester chain polymer. Examples of polyester polymers may be selected from the group consisting of a homo-polyester, a co-polyester, and a co-polyester-polyether.

In one set of embodiments the photochromic polymer is selected from the group consisting of poly($C_1$ to $C_{10}$ acyloxy); poly[($C_1$ to $C_{10}$ acyloxy)-co-($C_1$ to $C_{10}$ acyloxy)]; poly(acyloxy)alkoxide; poly[($C_1$ to $C_{10}$ alkylene)-co-($C_1$ to $C_{10}$ acyloxy); poly($C_1$ to $C_{10}$ alkylene)-block-poly($C_1$ to $C_{10}$ acyloxy); poly[($C_1$ to $C_{10}$ alkylene oxide)-co-($C_1$ to $C_{10}$ acyloxy)]; and poly($C_1$ to $C_{10}$ alkylene oxide)-block-poly($C_1$ to $C_{10}$ acyloxy).

In one set of embodiments the photochromic polymer is of formula I:

$$(PC\text{-}L^a\text{-}(Q)_n\text{-}L^b)_Z X \qquad (I)$$

wherein $(Q)_n$ is a polymer comprising a polyester, n of $(Q)_n$ is an integer from 1 to 50;

Z is an integer from 2 to 8;

$L^a$ and $L^b$ are each independently a bond or a linker;

PC are independently selected photochromic moieties; and

X is a bond, or a linear or branched hydrocarbon comprising from 1 to 20 carbon atoms (preferably of 2 to 6 carbon atoms) or a hydrocarbon ether or polyether of 2, 3 or 4 hydrocarbon units each of 3 to 6 carbon atoms joined through ether linkages and together providing covalent bonds to from 2 to 8 (PC-$L_1$-$(Q)_n$-$L_2$)$_Z$ units.

In another set of embodiments, there is provided a photochromic polymer derived from dihydroxy poly(caprolactone), poly[di(ethylene glycol)adipate], or poly caprolactone triol.

In another set of embodiments, there is provided a photochromic polymeric composition comprising a photochromic polymer and a host polymer.

In another set of embodiments, there is provided a photochromic polymeric composition is free from polydialkylsiloxane polymer.

In another set of embodiments, there is provided a photochromic lens comprising a photochromic polymeric composition.

BRIEF DESCRIPTION OF THE DRAWINGS

FIG. 1: Comparison of coloration and decolouration speed of compounds of the invention and control. Absorbance monitored at 560 nm (λmax of coloured form of the photochromic dye). UV irradiation for 15 minutes (colouration) followed by 30 minutes monitoring of decolouration in the dark.

DETAILED DESCRIPTION

The photochromic polymer combines at least two photochromic moieties linked by a straight or branched chain polyester polymer. Polyester polymers are a class of polymers comprising acyloxy groups (also referred to as carboxylate esters) (P1) in the repeating units of the polymer chain. The polyester polymer will vary depending on the monomer or combination of monomers, as well as the polymerization methods employed. Additionally, polyesters may be thermoplastic or thermoset, and optionally biodegradable.

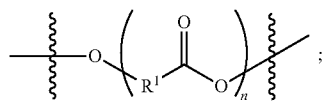
(P1)

wherein $R^1$ is any linear or branched aliphatic radical, cycloaliphatic radical, aryl radical and/or araliphatic radical.

An aliphatic radical may be straight or branched aliphatic hydrocarbon radical having 1 to 20, preferably 2 to 10, carbon atoms. Cycloaliphatic radicals may be cycloaliphatic hydrocarbon radicals having 4 to 15, preferably 5 to 10, carbon atoms. Examples of aliphatic hydrocarbon radicals include:

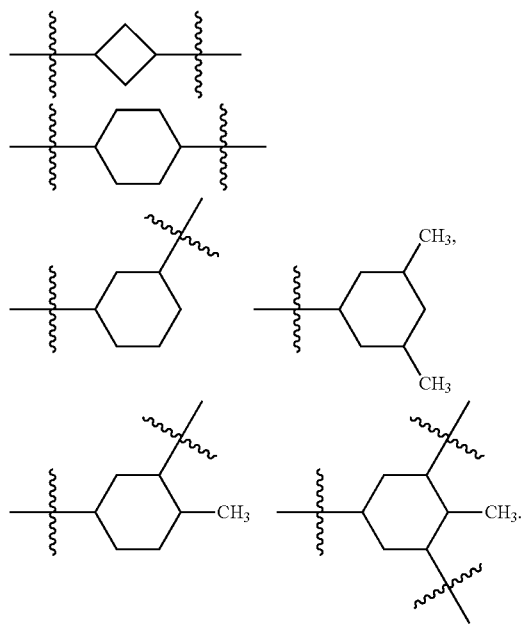

An aryl radical may be aromatic hydrocarbon radical having 6 to 15, preferably 6 to 13, carbon atoms. Examples include phenyl, napthyl and biphenyl.

An araliphatic radical may be an araliphatic hydrocarbon radical having 8 to 15, preferably 8 to 12 carbon atoms. Examples include benzyl,

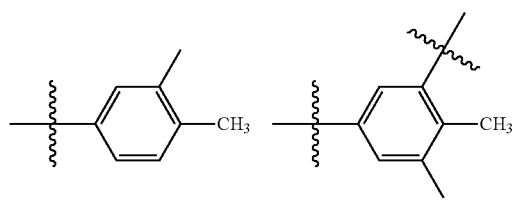

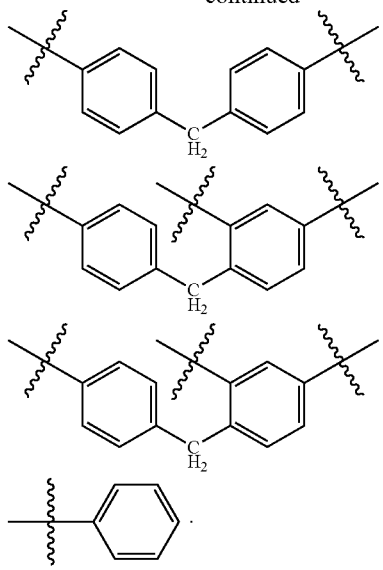

Polymers that comprise a single monomer are known as homo-polymers, while polymers derived from two or more monomers are known as co-polymers. Block-co-polymers comprise two or more homopolymer subunits linked by covalent bonds.

The photochromic polymer of the present invention comprises at least two photochromic moieties linked by a linear or branched polymer, wherein the polymer comprises a polyester. Preferably the polyester is selected from the group consisting of a homo-polyester, a co-polyester, and a co-polyester-polyether. More preferably the polymer is selected from poly($C_1$ to $C_{10}$ acyloxy); poly[($C_1$ to $C_{10}$ acyloxy)-co-($C_1$ to $C_{10}$ acyloxy)]; poly(acyloxy)alkoxide; poly[($C_1$ to $C_{10}$ alkylene)-co-($C_1$ to $C_{10}$ acyloxy); poly($C_1$ to $C_{10}$ alkylene)-block-poly($C_1$ to $C_{10}$ acyloxy); poly[($C_1$ to $C_{10}$ alkylene oxide)-co-($C_1$ to $C_{10}$ acyloxy)]; and poly($C_1$ to $C_{10}$ alkylene oxide)-block-poly($C_1$ to $C_{10}$ acyloxy).

In one set of preferred embodiments the polyesters of the present invention are prepared by bi-condensation of hydroxy carboxylic acids or by polycondensation of di-carboxylic acids with at least dihydroxy compounds. The condensation products may also comprise chain branching agents selected from poly alcohols and poly acids. The polyesters can also be prepared by polycondensation or polyaddition reactions of aliphatic, cycloaliphatic, araliphatic and/or aromatic carboxylic acid derivatives with aliphatic, cycloaliphatic, araliphatic and/or aromatic alcohols.

In a set of preferred embodiments, the polyester is derived from compounds having two carboxyl groups and compounds having two hydroxyl groups, optionally in the presence of branching agents comprising more than two groups selected from hydroxyl and carboxylic acid. In this instance, compounds having two carboxyl groups are preferably selected from the group consisting of maleic acid, fumaric acid, malonic acid, adipic acid, glutaric acid, succinic acid, pimelic acid, suberic acid, azelaic acid, sebacic acid, dodecanedioic acid, cyclopentane-1,1-dicarboxylic acid, cyclopentane-1,2-dicarboxylic acid, cyclopentane-1,3-dicarboxylic acid, cyclohexane-1,1-dicarboxylic acid, cyclohexane-1,2-dicarboxylic acid, cyclohexane-1,3-dicarboxylic acid, cyclohexane-1,4-dicarboxylic acid, and/or their anhydrides and/or their acid chlorides; and compounds having at least two hydroxyl groups are preferably selected from the group consisting of butanediol, neopentyl glycol, pentanediol, hexanediol, trimethylolpropane, pentaerythritol, glycerol, ethylene glycol and its higher homologues such as diethylene glycol and Methylene glycol, propylene glycol and its higher homologues such as dipropylene glycol, tripropylene glycol and combinations thereof.

In another set of preferred embodiments the polyesters of the present invention are prepared by polycondensation of hydroxycarboxylic acids and/or their derivatives such as lactones with themselves and/or with the abovementioned carboxylic acid derivatives and/or alcohols.

In a set of preferred embodiments, the polyester of the present invention is derived from glycolic acid, lactic acid, hydroxypropionic acid, hydroxybutyric acid and hydroxyvaleric acid, β-propiolactone, γ-butyrolactone, δ-valerolactone, ε-caprolactone, 3-methyl-1,4-dioxane-2,5-dione, 3,6-dimethyl-1,4-dioxane-2,5-dione, 3,6-dimethyl-1,4-dioxane-2,5-dione, 1,4-dioxane-2,5-dione, p-dioxanone, and combinations thereof.

In addition to the acids described above, fatty acid derivatives, in particular dimeric fatty acid derivatives, and α,β-unsaturated carboxylic acids, in particular hydroxy-functionalized α,β-unsaturated carboxylic acids, are also suitable.

In another preferred set of embodiments, the polyester of the present invention is a co-polyester-polyether or a block-co-polyester-polyether. In this instance, in addition to the polyester of a co-polyester-polyether or a block-co-polyester-polyether is as described above. The polyether of the co-polyester-polyether or a block-co-polyester-polyether may be derived from an alkylene oxide.

The polyester polymer may be a linear polyester linking two photochromic moieties or may be a branched polyester linking two or more photochromic moieties, such as 2 to 6 photochromic moieties, and preferably 2, 3, or 4 photochromic moieties.

In a preferred set of embodiments, the polyether of the co-polyester-polyether or the block-co-polyester-polyether is derived from ethylene oxide, 1,2-epoxypropane (propylene oxide), 1,2-methyl-1,2-ethoxypropane, 1,2-epoxybutane, 2,3-epoxybutane (butylene oxide), 3-methyl-1,2-epoxybutane, 1,2-epoxypentane, 3-methyl-1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxycyclopentane, 1,2-epoxycyclohexane, vinyloxirane, 2,3-epoxypropyl methyl ether, 2,3-epoxypropyl ethyl ether, 2,3-epoxypropyl isopropyl ether, 2,3-epoxyl-1-propanol, 3,4-epoxybutyl stearate, 4,5-epoxypentyl acetate, 2,3-epoxylpropyl-methacrylate, 2,3-epoxylpropyl-acrylate, glycidyl butyrate, metyl-glycidate, ethyl 2,3-epoxybutanoate, (2,3-epoxypropyl)benzene, 3-phenoxy-1,2-epoxypropane, 4-(2,3-epoxypropyl)morpholine, 1-(oxiran-2-ylmethyl)pyrrolidin-2-one, styrene oxide, and combinations thereof.

In one set of preferred embodiments, the polyester is of formula (P2) or (P3):

(P2)

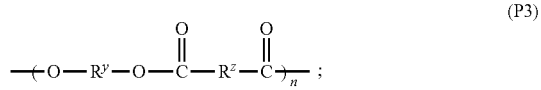
(P3)

wherein $R^x$, $R^y$ and $R^z$ are each independent selected from —$(CH_2)_t$— where t is an integer from 2 to 6 and

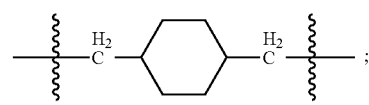

and n is an integer from 1 to 50.

In cases where the polyester is a branched chain polyester, the polyester will comprise at least one branching agent. The branched chain polyester may comprise a multiplicity of polyester chain segments linked via a chain branching agent.

Examples of chain branching agents containing more than two, preferably 3, 4, 5 or 6, functional groups selected from hydroxyl, carboxyl and ester functional groups.

Examples of suitable compounds are pentaerythritol; compounds having the formula: R—$(OH)_n$ wherein R is an alkylene group containing from three to six carbon atoms and n is an integer from 3 to 6, for example, glycerols, sorbitol, 1,2,6-hexanetriol and the like; compounds having the formula: R—$(CH_2OH)_3$ wherein R is an alkyl group containing from two to six carbon atoms, for example, trimethylol ethane, trimethylol propane, and the like compounds up to trimethylol hexane; and the compounds having the formula:

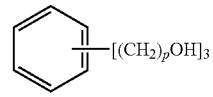

wherein p is an integer from 1 to 6. As examples of compounds having the above formula, there may be names 1,3,5-trimethylol benzene, 1,3,5-triethylol benzene; 1,3,5-tripropylol benzene, 1,3,5-tributylol benzene; and the like.

Aromatic polyfunctional acids or their esters may also be employed in this invention as chain-branching agents, and particularly those having the formula:

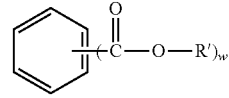

wherein R' is H or an alkyl group containing one to three carbon atoms and w is an integer of 3 or 4. As examples of compounds having the above formula, there may be named trimesic acid, trimethyl trimesate, and tetramethyl pyromellitate, and the like. In addition, there may be employed mixtures of the above acids and esters which are obtained in practical synthesis.

Specific examples of chain branching agents include those selected from the group consisting of glycerol, erythritol, xylitol, sorbitol, pentaerythritol, dipentaerythritol, tripentaerythritol, trimethylol ethane, trimethylol propane and anhydroenneaheptitol.

In one set of embodiments the photochromic polymer is of formula I:

$$(PC-L^a-(Q)_n-L^b)_ZX \quad (I)$$

wherein $(Q)_n$ is a polymer comprising a polyester, n of $(Q)_n$ is an integer from 1 to 50;
Z is an integer from 2 to 8;
$L^a$ and $L^b$ are each independently a bond or a linker;
PC is a photochromic moiety; and
X is a bond, or a linear or branched hydrocarbon comprising from 1 to 20 carbon atoms (preferably of 2 to 6 carbon atoms) or a hydrocarbon ether or polyether of 2, 3 or 4 hydrocarbon units each of 3 to 6 carbon atoms joined through ether linkages and together providing covalent bonds to from 2 to 8 $(PC-L_1-(Q)_n-L_2)_Z$ units.

The group X is bonded to each of the groups $(PC-L^a-(Q)_n-L^b)-$.

In one set of preferred embodiments, where X is a bond and Z is 2; the photochromic polymer is of formula IIa:

$(PC^1-L^{a1}-(Q^1)_{n1}-L^{b1})-(L^{b2}-(Q^2)_{n2}-L^{a2}-PC^2)$ (IIa)

Wherein $(Q^1)_{n1}$ and $(Q^2)_{n2}$ are as defined for $(Q)_n$; n1 and n2 of $(Q^1)_{n1}$ and $(Q^2)_{n2}$, respectively, are as defined for n;
$L^{a1}$ and $L^{a2}$ are as defined for $L^a$;
$L^{b1}$ and $L^{b2}$ are as defined for $L^b$; and
$PC^1$ and $PC^2$ are as defined for PC.

In another set of preferred embodiments, X is a linear or branched aromatic, aliphatic, or alkoxy aliphatic, preferably aliphatic of formula:

wherein m is from 1 to 6 and Z is as defined for formula I.

Examples of X when Z is from 2 to 8 include those selected from the group consisting of: ethyl, propyl, butyl, pentyl, hexyl, $-(CH_2)_{1-8}O(CH_2)_{1-8}-$ (for example $-CH_2CH_2OCH_2CH_2-$), wherein Z is 2;

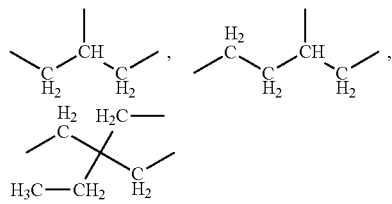

wherein Z is 3;

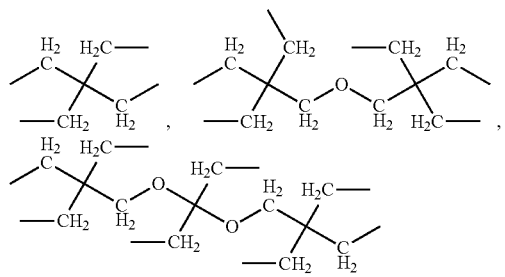

wherein Z is from 4, 6 or 8.

In another set of preferred embodiments, the photochromic polymer is of formula IIIa, IIIb or IIIc:

$PC^1-L^{a1}-(Q^1)_{n1}-L^{b1}-X^1-L^{b2}-(Q^2)_{n2}-L^{a2}-PC^2$ (IIIa)

wherein $X^1$ is selected from the group consisting of ethyl, propyl, butyl, pentyl, hexyl and $-(CH_2)_{1-8}O(CH_2)_{1-8}-$ (for example $-CH_2CH_2OCH_2CH_2-$), and

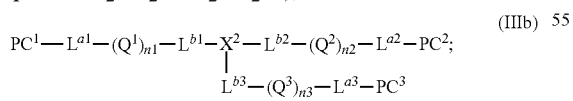

wherein $X^2$ is a linear or branched hydrocarbon of formula $C_mH_{2m-1}$; wherein m is from 1 to 6; and preferably $X^2$ is selected from:

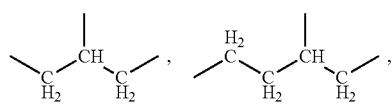

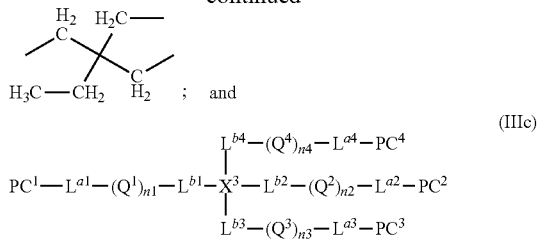

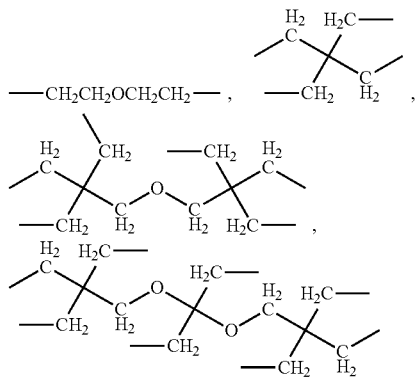

wherein $X^3$ is a linear or branched hydrocarbon of formula $C_mH_{2m-2}$; wherein m is from 1 to 6; and preferably $X^3$ is selected from:

and wherein $(Q^1)_{n1}$, $(Q^2)_{n2}$, $(Q^3)_{n3}$ and $(Q^4)_{n4}$ are as defined for Q; n1, n2, n3 and n4 of $(Q^1)_{n1}$, $(Q^2)_{n2}$, $(Q^3)_{n3}$ and $(Q^4)_{n4}$, respectively, are each independently an integer from 1 to 50; and
$L^{a1}$, $L^{a2}$, $L^{a3}$ and $L^{a4}$ are as defined above for $L^a$;
$L^{b1}$, $L^{b2}$, $L^{b3}$ and $L^{b4}$ are as defined above for $L^b$;
$PC^1$, $PC^2$, $PC^3$ and $PC^4$ is as defined for PC.

The groups, $L^a$ and $L^b$ in formula I (and further $L^{a1}$, $L^{a2}$, $L^{a3}$, $L^{a4}$, $L^{b1}$, $L^{b2}$, $L^{b3}$ and $L^{b4}$ in formula IIa, IIIa, IIIb and IIIc) may be a bond or a linker. In a preferred set of embodiments, $L^a$ and $L^b$ are each a linker. Specific examples of $L^a$ and $L^b$ linker include $-CH_2-$, $-O-$, $-N(R^4)-$, $-S-$, $-Si-$, $-C(=O)-$, $-C(=S)-$, $-OC(=O)-$, $-N(R^4)C(=O)-$, $-O(CH_2)_xO-$, $-OC(=O)-(CH_2)_x-C(=O)O-$, $-OC(=O)-O-C(=O)O-$ a linear or branched hydrocarbon comprising from 1 to 20 carbon atoms (preferably of 2 to 6 carbon atoms), a hydrocarbon ether or polyether of 2, 3 or 4 hydrocarbon units each of 3 to 6 carbon atoms joined through ether linkages, a hydrocarbon ester or polyester of 2, 3 or 4 hydrocarbon units each of 3 to 6 carbon atoms joined through ester linkages; wherein $R^4$ is H or an alkyl group of 1 to 6 carbon atoms, and x is an integer from 1 to 10.

Specific examples of where $L^b$ and X, taken together, are

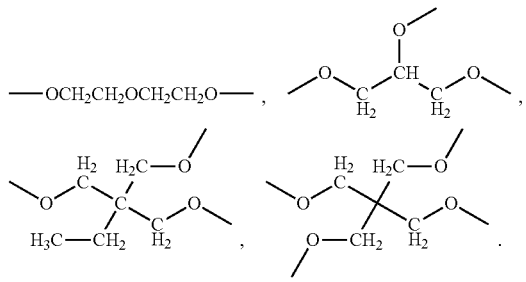

The photochromic polymers comprise the straight or branched chain polymers which covalently link two or more photochromic moieties. The photochromic moieties are typically located at the terminal of a polymer chain and in the case of branched polymers are preferably located at the terminal of the branches. In one set of embodiments the polymer is in the form of a branched polymer having 3 or more branches radiating, for example from hydrocarbon group X and having terminal photochromic moieties.

In a preferred set of embodiments, $L^a$ is a group selected from the following formula:

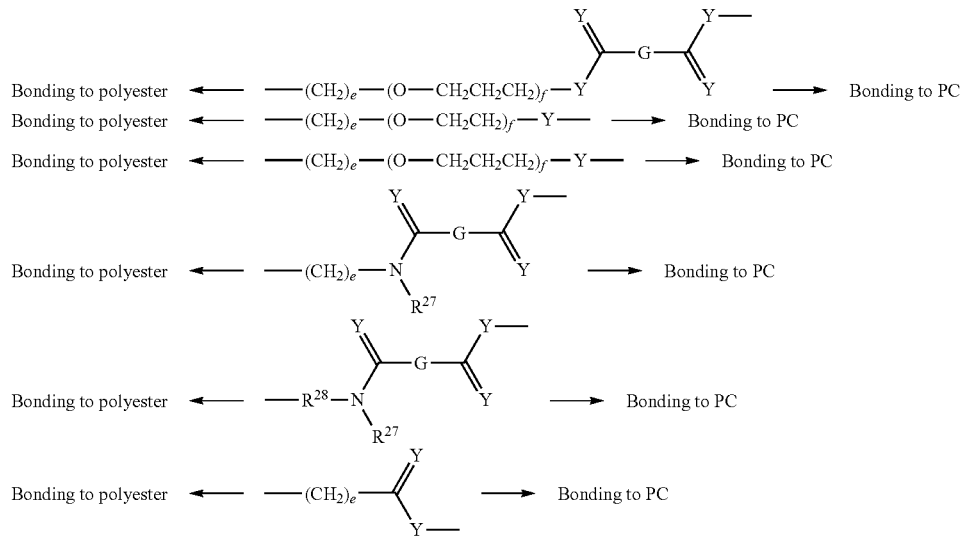

wherein Y is independently oxygen or sulphur, $R^{27}$ is hydrogen or $C_{1-10}$ linear or branched alkyl, $R^{28}$ is $C_{1-10}$ linear or branched alkyl, e is an integer from 1 to 15, and f is an integer from 0 to 10, and wherein G is linear or branched $C_{1-10}$ alkyl, $C_{1-10}$ alkenyl or 1,2-, 1,3-, or 1,4-substituted aryl, or substituted heteroaryl. Preferably Y is oxygen.

In another preferred set of embodiments, $L^a$ is a group selected from the following formula:

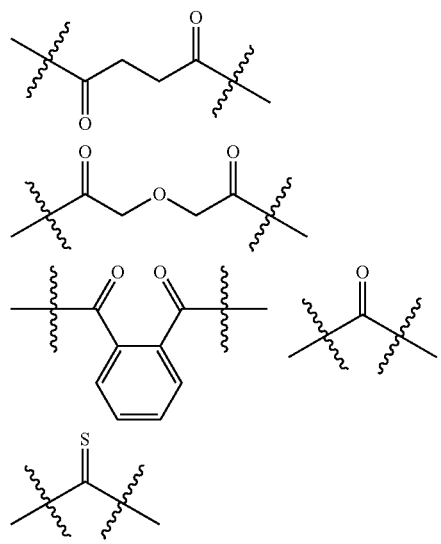

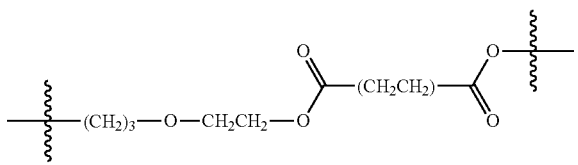

The photochromic moieties are covalently linked (optionally through a linker $L^a$) to the polymer.

Examples of photochromic compounds which may be used in preparation of the photochromic moiety are disclosed in U.S. Pat. No. 5,446,151, U.S. Pat. No. 5,650,098, U.S. Pat. No. 5,623,005, U.S. Pat. No. 6,303,672 and International Application publication No. WO 2009/146509.

In a preferred set of embodiments the photochromic moieties are independently selected from the group consisting of naphthopyrans, spiropyrans and spirooxazines.

The photochromic polymer preferably comprises two or more photochromic moieties independently selected from the moieties of formula IVa to IVd:

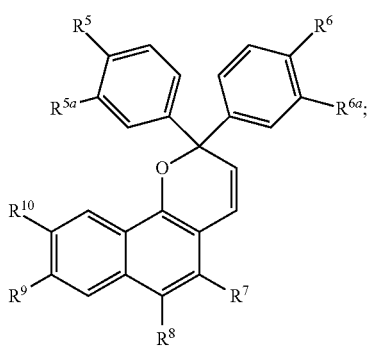

(IVa)

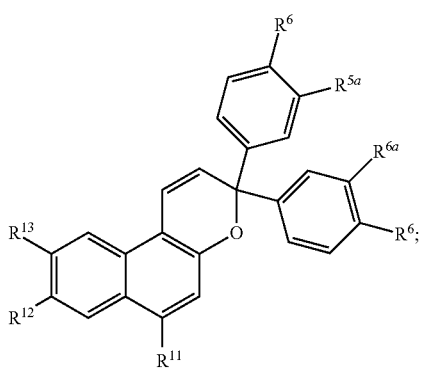

(IVb)

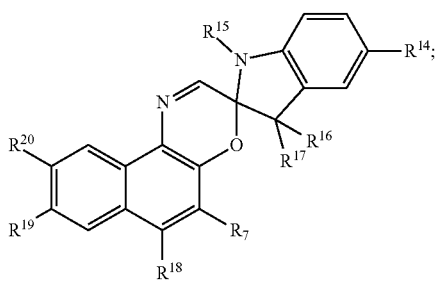

(IVc)

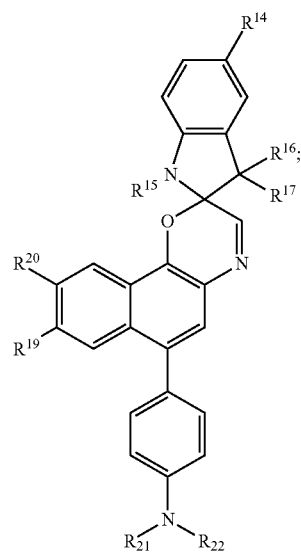

(IVd)

wherein $R^5$ and $R^6$ independently represent hydrogen, $C_{1-10}$ alkyl, $C_{1-10}$ alkoxy, $C_{1-10}$ hydroxyalkoxy, $C_{1-10}$ alkoxy($C_{1-10}$)alkoxy, phenyl, $C_{1-10}$ alkoxyphenyl, halogen, $C_{1-5}$ haloalkyl, $C_{1-5}$ alkylamino, $C_{1-5}$ dialkylamino, arylamino, diarylamino, aryl $C_{1-5}$ alkylamino, or a cyclic amino group;

$R^{5a}$ and $R^{6a}$ are hydrogen or together with $R^5$ and $R^6$ respectively may form a carbocyclic or heterocyclic ring of 5 or 6 constituent ring members and optionally up to two heteroatoms selected from oxygen, sulfur and —N($R^{27}$)— wherein $R^{27}$ is selected from hydrogen and $C_{1-10}$ alkyl;

$R^7$ represents hydrogen, $C_{1-10}$ alkyl, up to $C_{20}$ cycloalkyl, up to $C_{20}$ bicycloalkyl, $C_{2-10}$ alkenyl, $C_{1-10}$ alkoxy, $C_{1-10}$ hydroxyalkyl, $C_{1-10}$ alkoxy($C_{1-10}$)alkyl, $C_{1-10}$ aminoalkyl, $C_{1-20}$ alkoxycarbonyl, carboxyl, halogen, aryloxycarbonyl, formyl, acetyl or aroyl;

$R^8$ represents, phenyl, $C_{1-10}$ alkoxyphenyl, $C_{1-10}$ dialkoxyphenyl, $C_{1-10}$ alkylphenyl, $C_{1-10}$ dialkylphenyl or one of the groups specified for $R^7$; or $R^7$ and $R^8$ together form a cyclic structure of the type

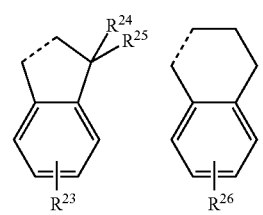

$R^9$, $R^{10}$, $R^{11}$, $R^{12}$, $R^{13}$, $R^{14}$, $R^{16}$, $R^{17}$, $R^{18}$, $R^{19}$, $R^{20}$, $R^{23}$, $R^{24}$, $R^{25}$ and $R^{26}$ are as defined for $R^5$ and $R^6$; and $R^{15}$, $R^{21}$ and $R^{22}$ represents linear or branched $C_{1-10}$ alkyl, $C_{1-10}$ hydroxyalkyl, or together form a $C_{5-7}$ ring.

Examples of suitable photochromic moieties include:
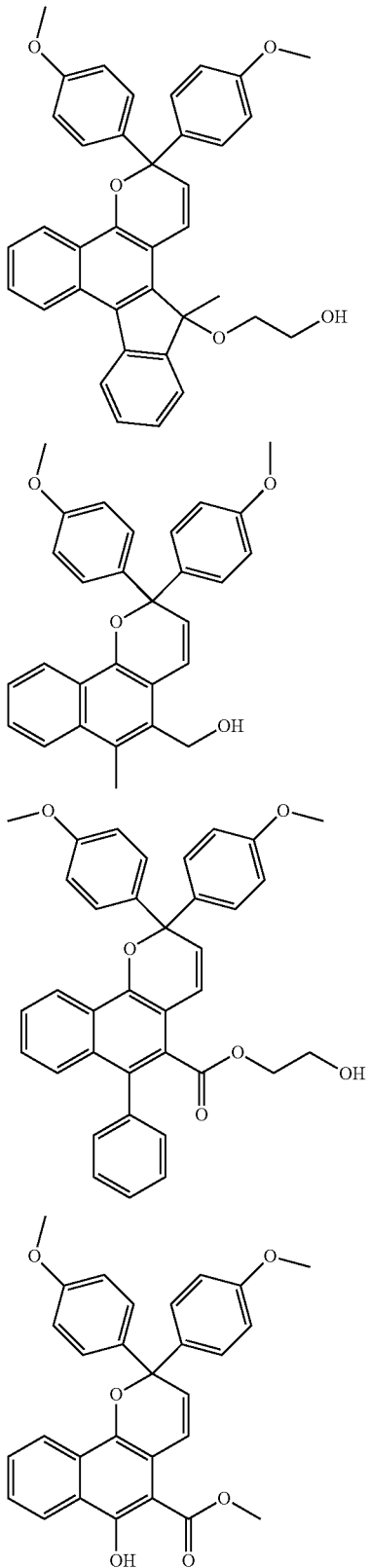
-continued
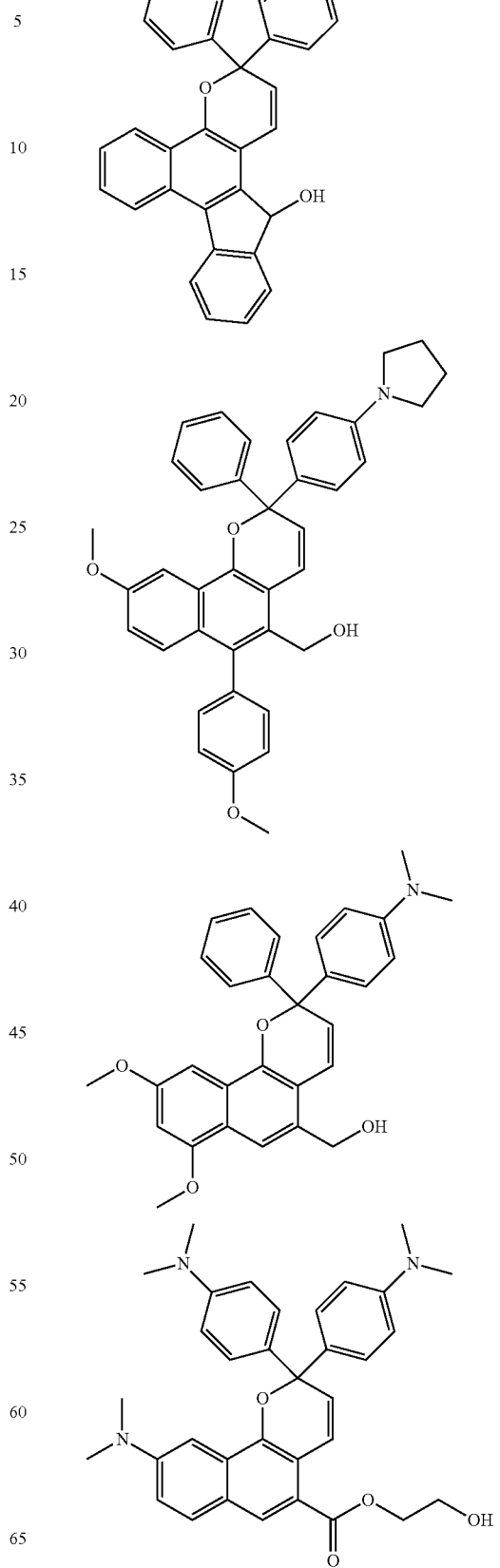

15
-continued
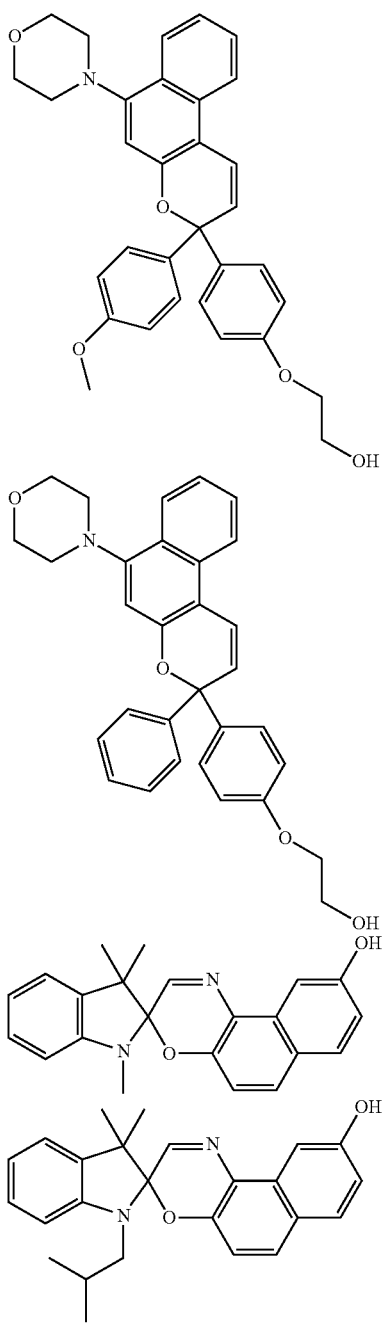
16
-continued
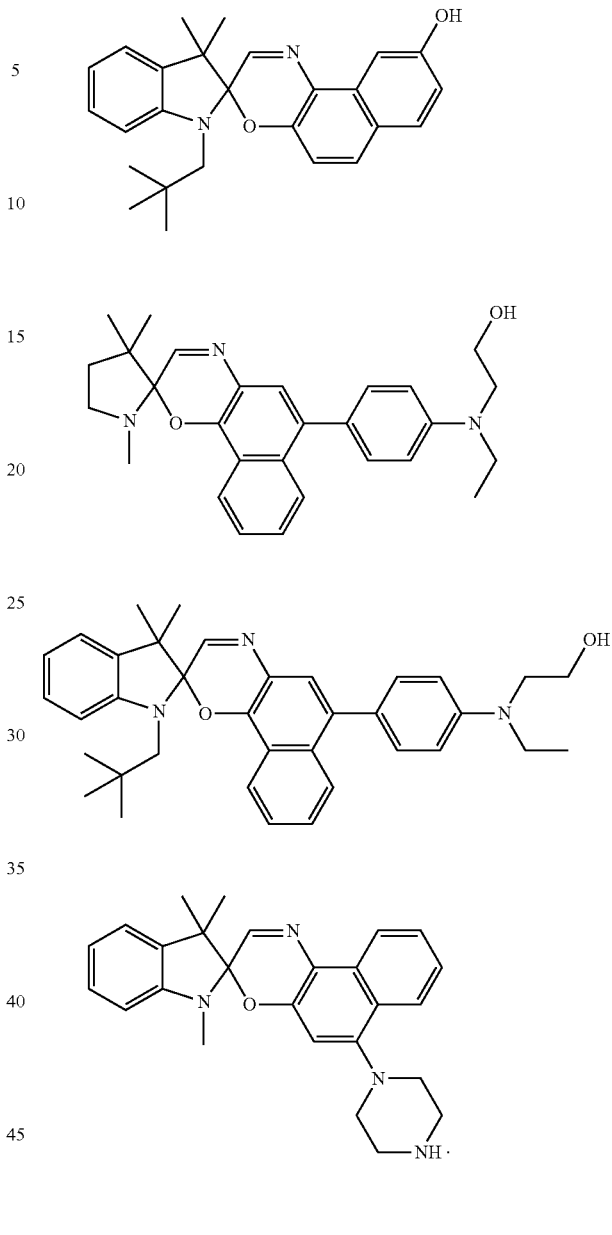
Examples of suitable homo polymers and co-polymers (including block-co-polymers and polyester-co-polyethers) are shown in Tables 1.1.
TABLE 1.1
Examples of suitable polymers
| Entry | Structure | Name |
|---|---|---|
| 1 |  | polyglyocolide |

TABLE 1.1-continued

Examples of suitable polymers

| Entry | Structure | Name |
|---|---|---|
| 2 | | poly(D,L-lactide); poly(D-lactide); poly(L-lactide) |
| 3 | | poly-4-hydroxy-butyrate |
| 4 | | poly-3-hydroxy-butyrate |
| 5 | | poly-3-hydroxy-valerate (PHV) |
| 6 | | poly(caprolactone) |
| 7 | | Poly-caprolactone diol |
| 8 | | poly caprolactone triol |
| 9 | | poly(3-hydroxy-butyric acid-co-3-hydroxyl-valeric acid) |
| 10 | | poly(D,L-lactide-co-glycolide) |
| 11 | | poly(D,L-lactide-co-caprolactone) |

TABLE 1.1-continued

Examples of suitable polymers

| Entry | Structure | Name |
|---|---|---|
| 12 | | poly(D,L-lactide-co-caprolactone-co-glycolide) |
| 13 | | poly(dioxanone) |
| 14 | | poly(ethylene succinate) |
| 15 | | poly(ethylene adipate) |
| 16 | | poly[di(ethylene glycol)adipate] |
| 17 | | poly(ethylene glycol)-block-poly(caprolactone) |
| 18 | | poly(ethylene glycol)-block-polylactide |
| 19 | | poly(ethylene oxide)-block-poly-caprolactone (4 arms) |

TABLE 1.1-continued

Examples of suitable polymers

| Entry | Structure | Name |
|---|---|---|
| 20 | [structure] | poly(ethylene oxide)-block-polylactide (4 arms) | wherein n and m, at each instance, are each independently an integer from 1 to 50.

wherein n and m, at each instance, are each independently an integer from 1 to 50.

Examples of suitable strategies for accessing the photochromic polyesters of the present invention are subsequently provided.

Homo-, co- and block-co-polyester polymers may be prepared by a number of different methods, including but not limited to the summary provided in Table 2.1, esterification of hydroxy acids (Entry 21), or diols and dicaboxylic acids (Entry 22). Polyesters can also be accessed by ester exchange including alcoholysis (Entry 23) or acidolysis (Entry 24). Acylation of diols with diacidchlorides also provides polyesters (Entry 25). Similarly, polyesters can be prepared by ring opening polymerization of lactones (Entry 6) or dilactones (Entry 27).

Esterification of dicarboxylic acids and diols, acylation and ring opening polymerizations (Entries 22, 25, 26 and 27) are more preferred methods in the art.

TABLE 2.1

Synthetic routes to polyesters

| Entry | Name |
|---|---|
| 21 | Esterification Hydroxy acids |
| 22 | Esterification Diols and Dicarboxyllic acids |
| 23 | Ester Exchange Alcoholysis |
| 24 | Ester Exchange Acidolysis |
| 25 | Acylation |
| 26 | Ring opening polymerization Lactones |

TABLE 2.1-continued

Synthetic routes to polyesters

| Entry | Name | |
|---|---|---|
| 27 | Ring opening polymerizations Dilactones | 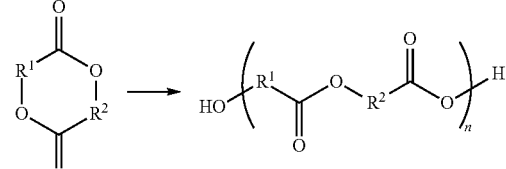 | wherein $R^1$, $R^2$ and $R^3$ are each individually selected from linear or branched aliphatic, cycloaliphatic, and/or araliphatic, and n is an integer of 1 to 50.

In a preferred embodiment, a polyester derived from the condensation of a diol monomer with a di-carboxylic acid or a di-acid chloride monomer, as shown in Scheme 1.1. Synthetic strategies of this type provide polyesters with symmetrical termini, either diols or diacids, more preferably diacids.

Scheme 1.1

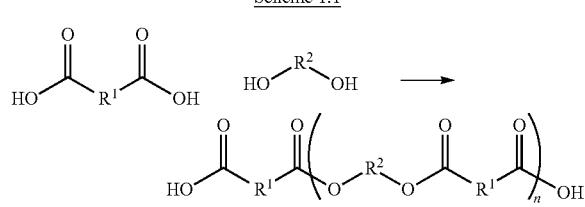

wherein $R^1$ and $R^2$ are each independently any linear or branched aliphatic, cycloaliphatic, and/or araliphatic; and n is an integer form 1 to 50.

A suitable photochromic moiety may then be appended to, for example, the dicarboxylic acid of Scheme 1.2; to provide a symmetrical polyester substituted with two photochromic moieties, as shown in Scheme 1.2.

Scheme 1.2

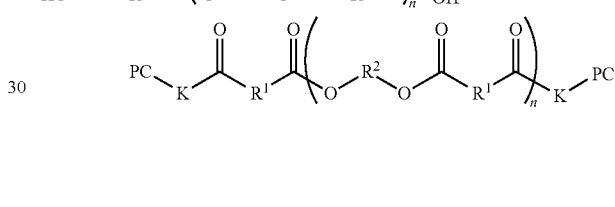

wherein $R^1$ and $R^2$ are as previously defined;

K is as defined for $L^a$ or a group that gives $L^a$ upon reaction with polyester;

n is an integer of 1 to 50; and

PC is as previously defined.

A more specific Example of the di-substituted polyester of Scheme 1.2 is provided in Scheme 1.3 below.

Scheme 1.3

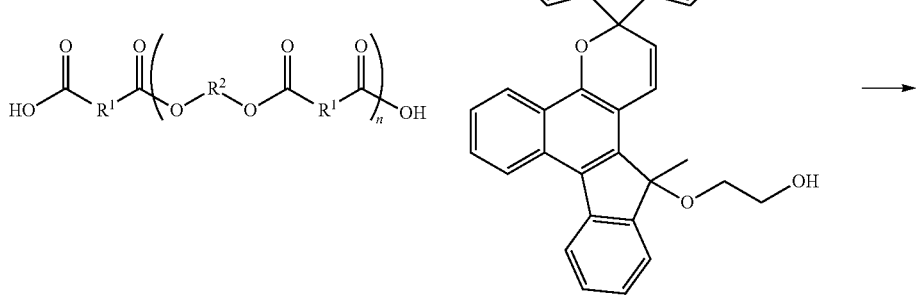

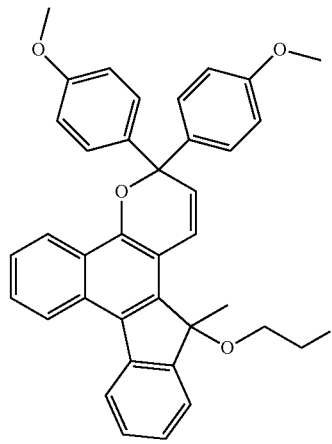

wherein $R^1$ and $R^2$ are as previously defined; and n is an integer from 1 to 50.

In another preferred embodiment, the parent polyester is derived from a process that results in a polyester comprising an carboxylic acid terminus and an alcohol terminus, as shown in Scheme 2.1.

Scheme 2.1

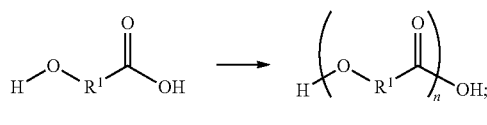

wherein $R^1$ is are as previously defined; and n is an integer of 1 to 50.

The alcohol terminus of parent polyester comprising both a carboxylic acid terminus and an alcohol terminus (as shown in Scheme 2.1), may be converted to a carboxylic acid, acid chloride or other appropriate linker by methods known in the art. An example may include the reaction with the parent polyester with succinic anhydride to provide a polyester comprising two carboxylic acid termini, as shown in Scheme 2.2.

Scheme 2.2

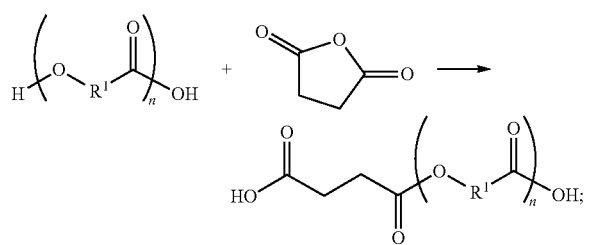

wherein $R^1$ is are as previously defined; and n is an integer of 1 to 50.

A suitable photochromic moiety may then be appended to the dicarboxylic acid of Scheme 2.2; to provide polyesters substituted with a two photochromic moieties, as shown in Scheme 2.3.

Scheme 2.3

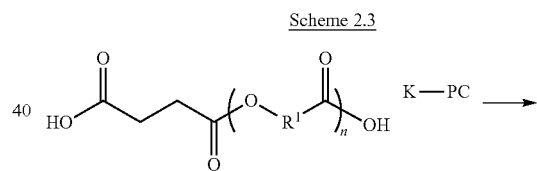

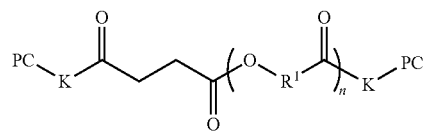

wherein $a^1$ is as previously defined;

K is as defined for $L^a$ or a group that gives $L^a$ upon reaction with polyester;

n is an integer from 1 to 50; and

PC is as previously defined.

A more specific example of the di-substituted polyester of Scheme 2.3 is provided in Scheme 2.4 below.

Scheme 2.4

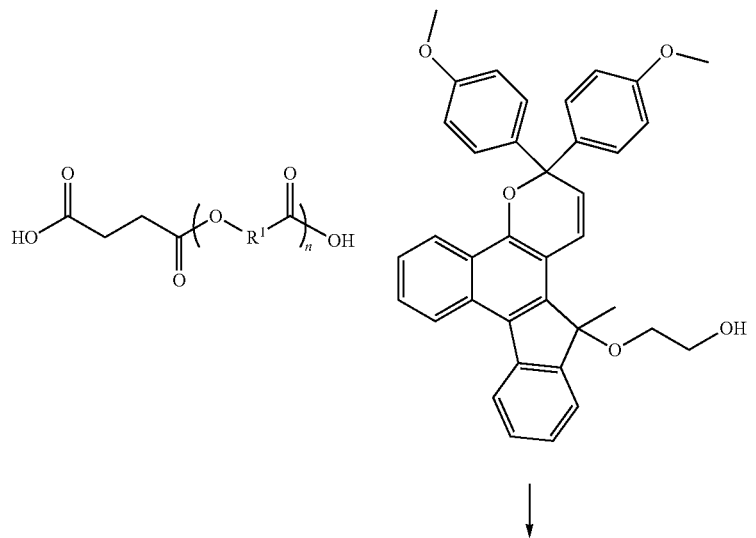

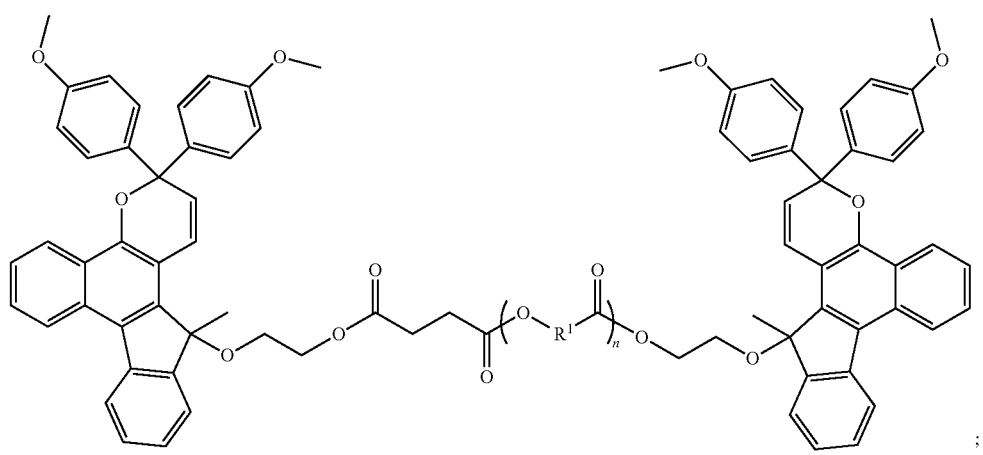

wherein $R^1$ as previously defined; and
n is an integer of 1 to 50.

In another preferred embodiment, dihydroxy polyesters may be used. Examples include commercially available poly caprolactone diol. As previously described, wherein the parent polyester terminates in an alcohol (or a diol), the alcohol may be converted to a carboxylic acid or acid chloride or other suitable linker by methods known in the art. An example of this may include the reaction with the parent polyester with succinic anhydride to provide a polyester comprising two carboxylic acid termini, as shown in Scheme 3.1.

Scheme 3.1

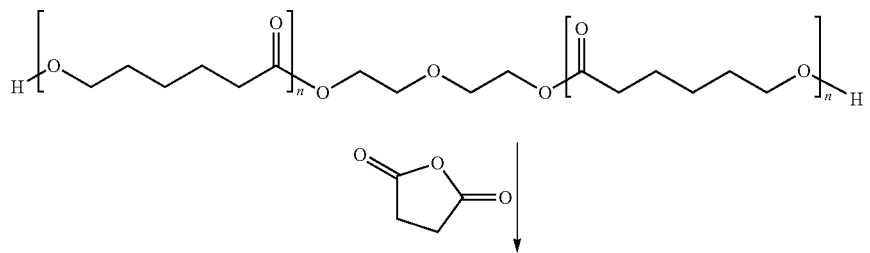

-continued

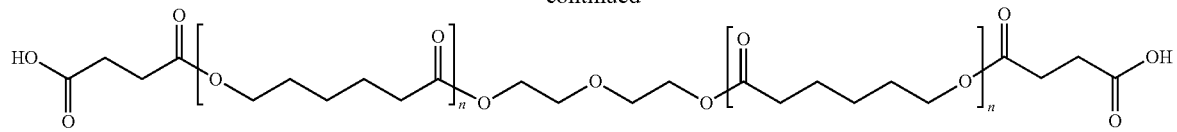

wherein n is 1 to 50.

A suitable photochromic moiety may then be appended to, for example, the di-carboxylic acid to provide a branched polyester substituted with two photochromic moieties, as shown in Scheme 3.2.

Scheme 3.2

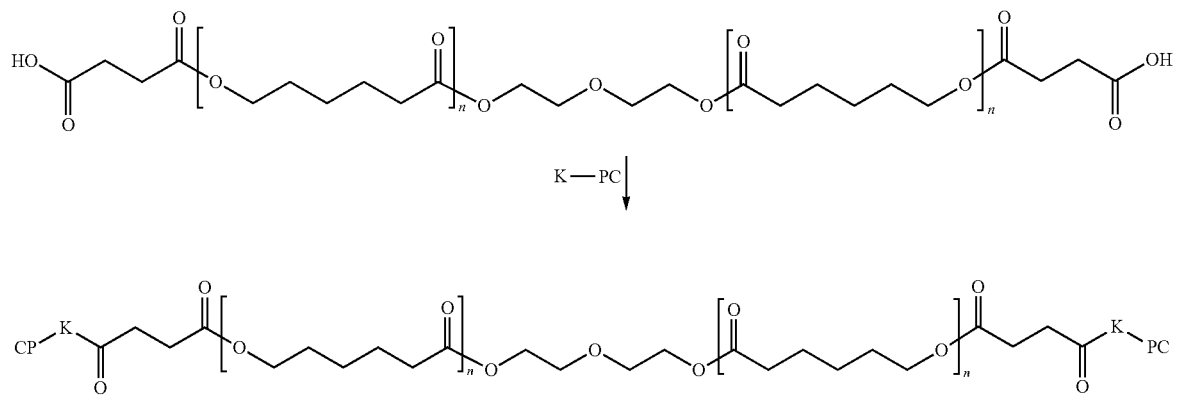

wherein K is as defined for $L^a$ or a group that gives $L^a$ upon reaction with polyester;

n is an integer from 1 to 50; and

PC is as previously defined.

A more specific example of a photochromic polyester of this type is shown in Scheme 3.3 below.

Scheme 3.3

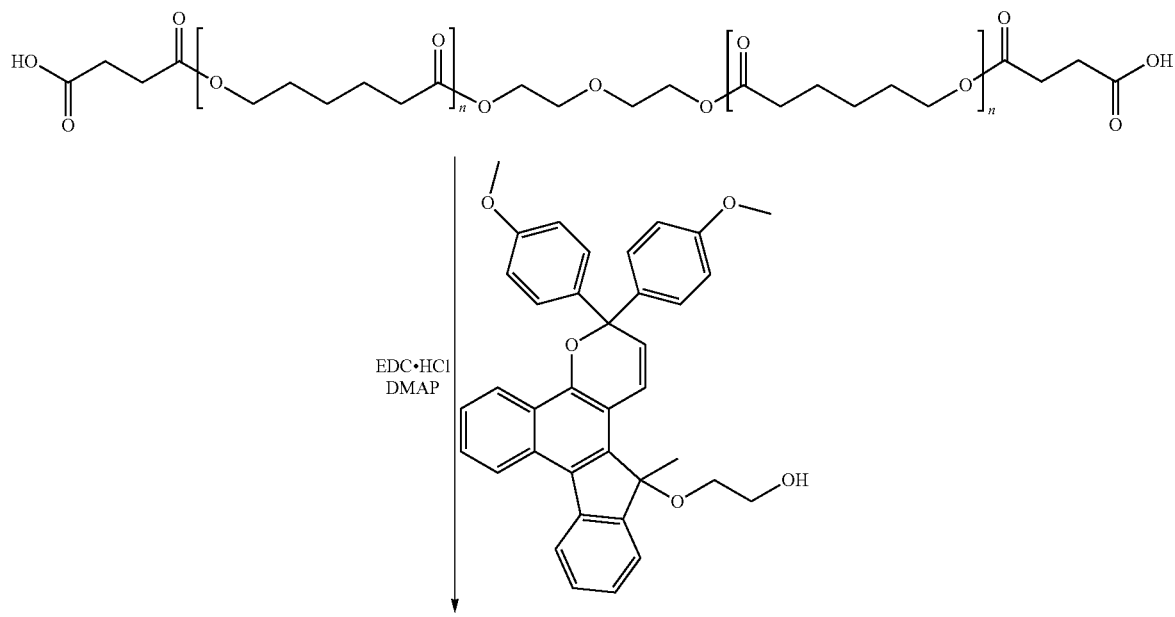

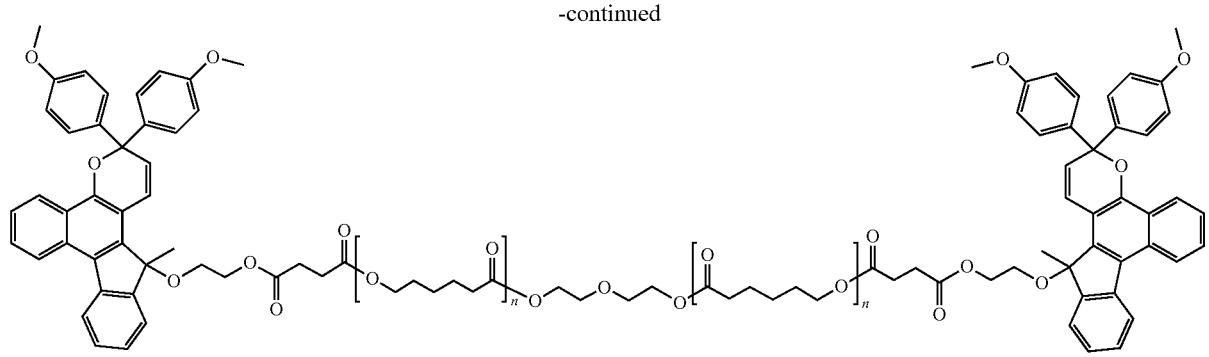

wherein n is an integer of 1 to 50.

In another preferred embodiment, polyester-co-polyether polymers may be used. Examples include commercially available poly[di(ethylene glycol)adipate]. As previously described, wherein the parent polyester terminates in an alcohol (or a diol), the alcohol may be converted to a carboxylic acid or acid chloride or other suitable linker by methods known in the art. An example of this may include the reaction with the parent polyester with succinic anhydride to provide a polyester comprising two carboxylic acid termini, as shown in Scheme 3.4.

Scheme 4.1

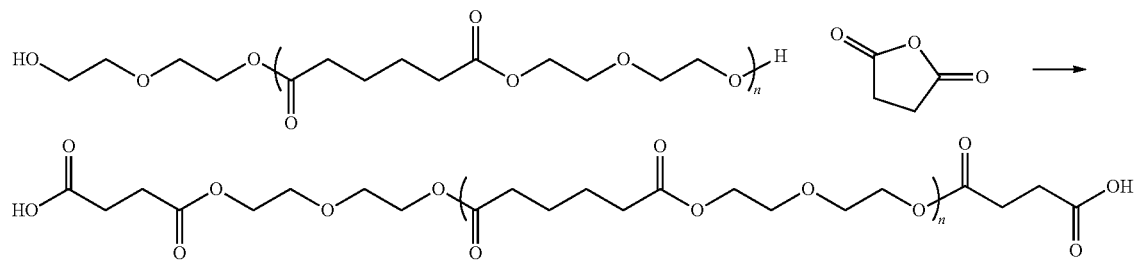

wherein n is an integer of 1 to 50.

A suitable photochromic moiety may then be appended to, for example, the di-carboxylic acid to provide a branched polyester substituted with three or more photochromic moieties, as shown in Scheme 3.5.

Scheme 4.2

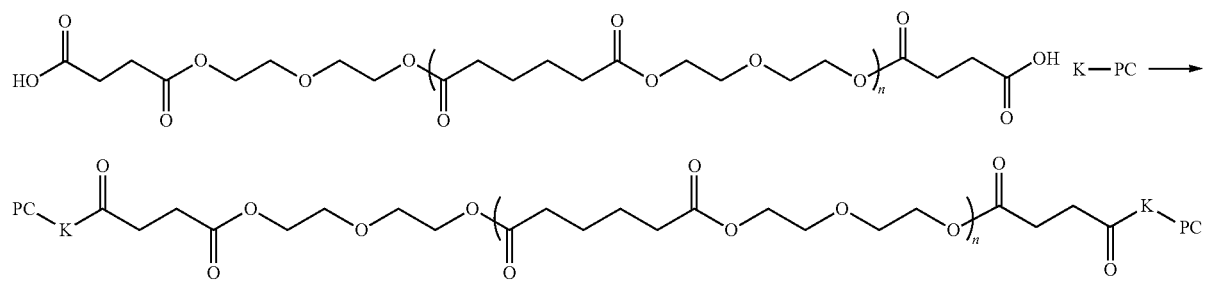

K is as defined for $L^a$ or a group that gives $L^a$ upon reaction with polyester;

n is an integer of 1 to 50; and

PC is as previously defined.

A more specific example of a photochromic polyester of this type is shown in Scheme 4.3 below.

Scheme 4.3

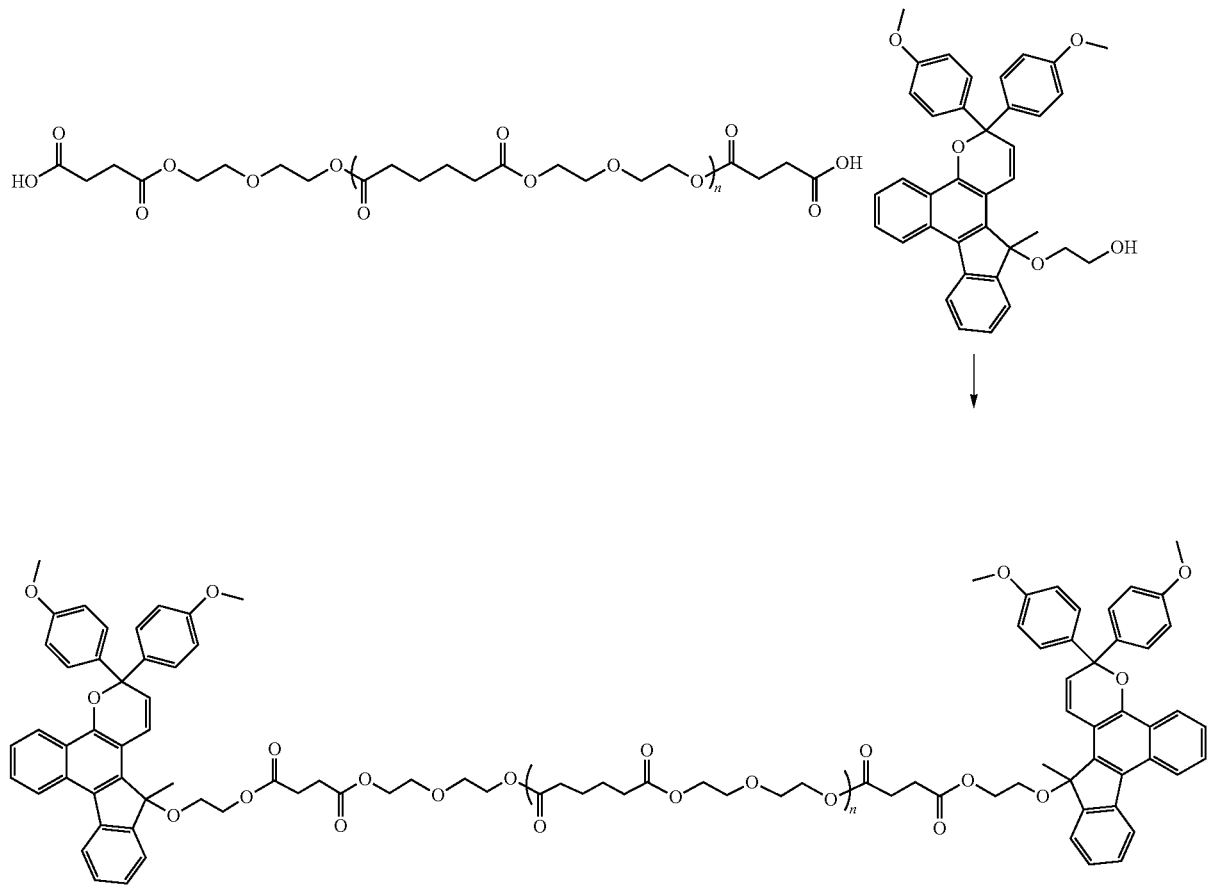

wherein n is 1 to 50.

In another preferred embodiment, branched polyesters or dendrimers may be used. Examples include commercially available poly caprolactone triol. As previously described, wherein the parent polyester terminates in an alcohol, the alcohol may be converted to a carboxylic acid or acid chloride or other suitable linker by methods known in the art. An example of this may include the reaction with the parent polyester with succinic anhydride to provide a polyester comprising three or more carboxylic acid termini, as shown in Scheme 5.1.

Scheme 5.1

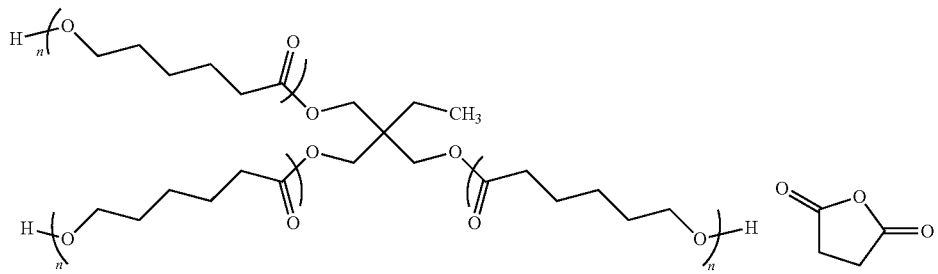

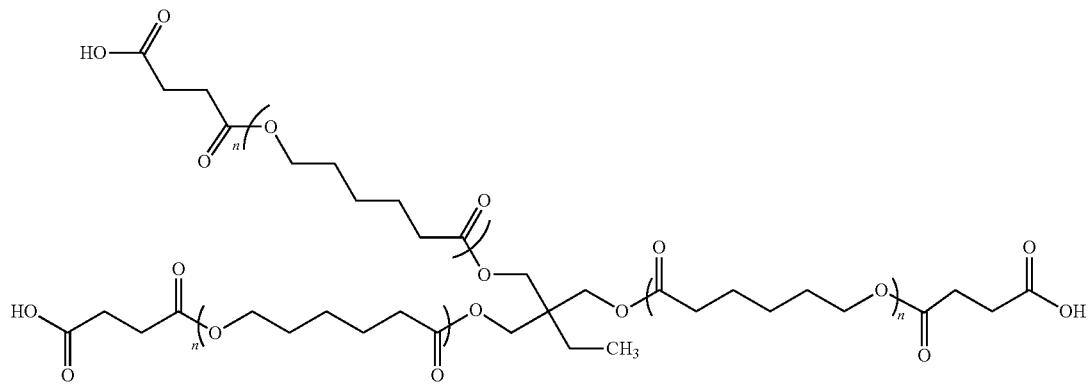

wherein n is 1 to 50.

A suitable photochromic moiety may then be appended to, for example, the tri-carboxylic acid to provide a branched polyester substituted with three or more photochromic moieties, as shown in Scheme 5.2.

Scheme 5.2

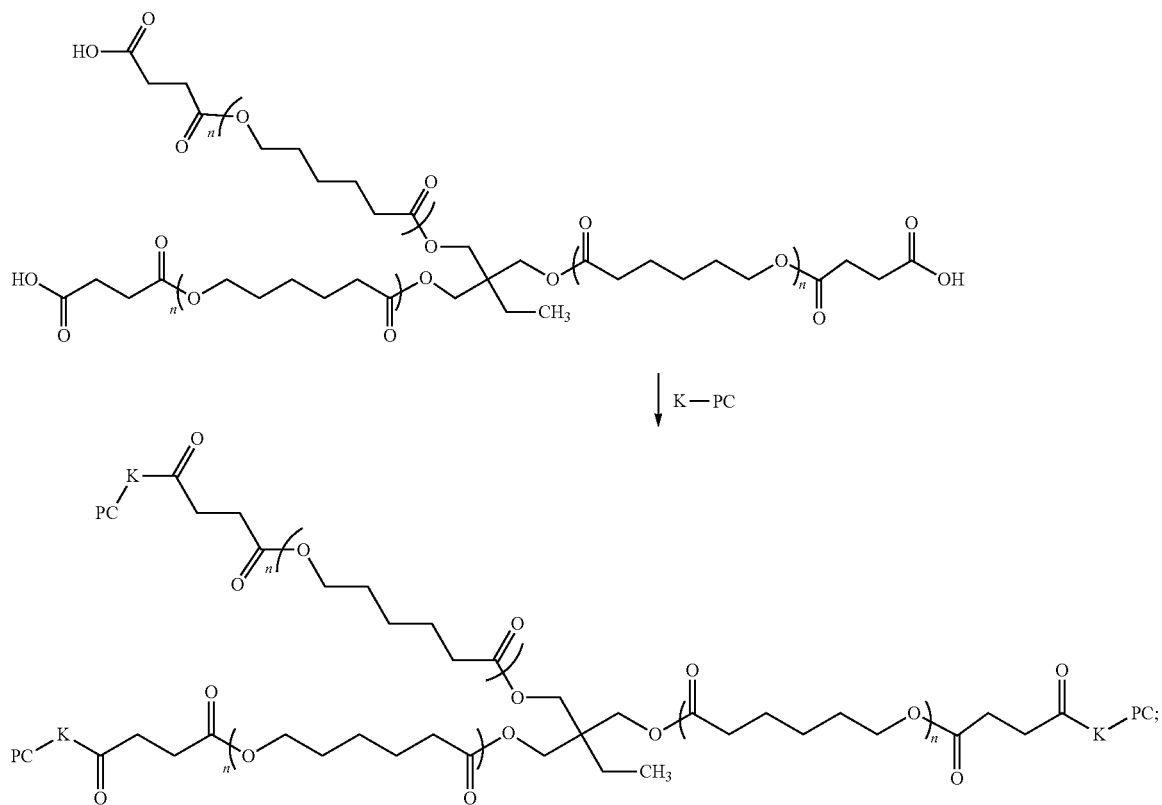

K is as defined for $L^a$ or a group that gives $L^a$ upon reaction with polyester;

n is an integer of 1 to 50; and

PC is as previously defined.

A more specific example of a photochromic polyester of this type is shown in Scheme 5.3 below.

Scheme 5.3

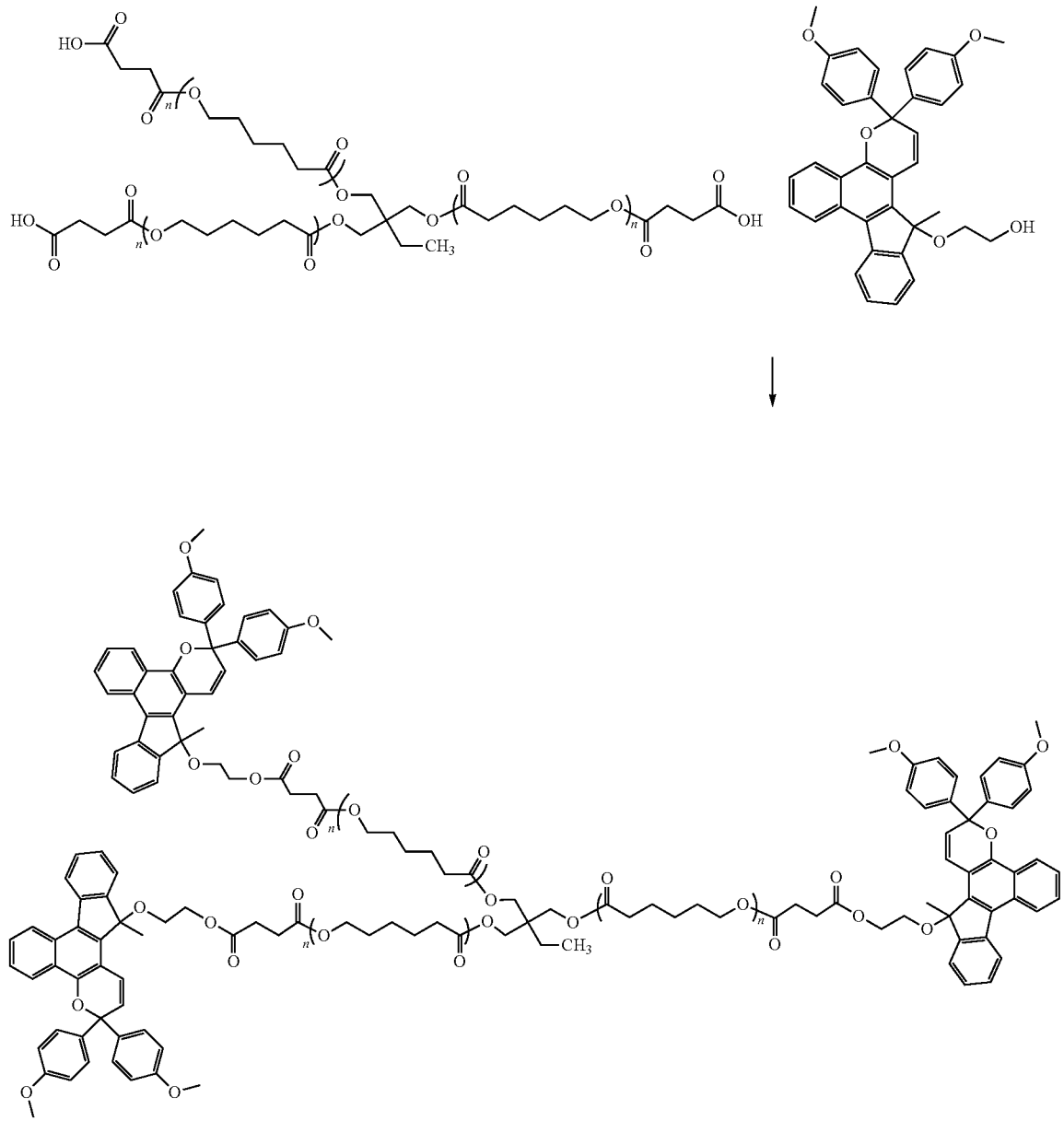

wherein n is an integer of 1 to 50.

While in certain abovementioned examples, the polymer precursor is functionalised with a linker derived from succinic anhydride, the invention is not limited to this linker only. In other embodiments, the linker may be derived from, for example, diglycolic anhydride, phthalic anhydride, phosgene, thiophosgene or other suitable linker. Examples of specific linkers ($L^a$) are provided below in Scheme 6.1 to 6.5, illustrated with poly caprolactone diol.

Scheme 6.1

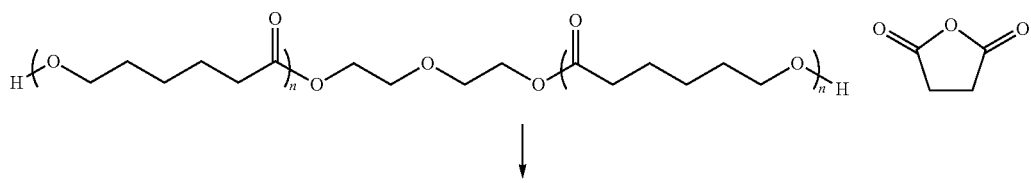

39
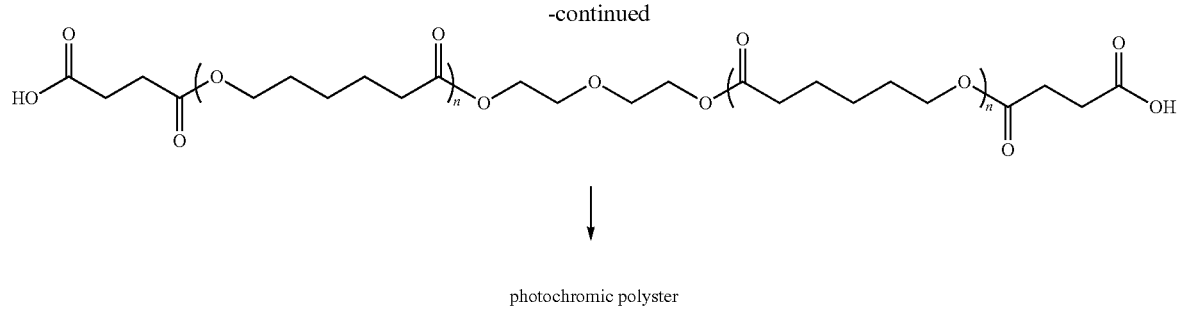
↓
photochromic polyester
Scheme 6.2
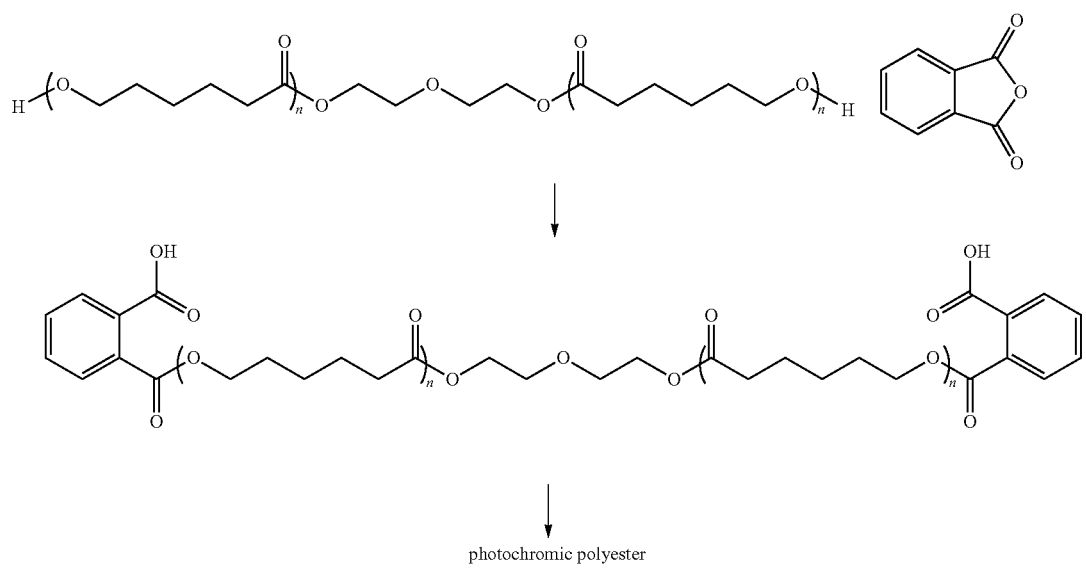
↓
photochromic polyester
Scheme 6.3
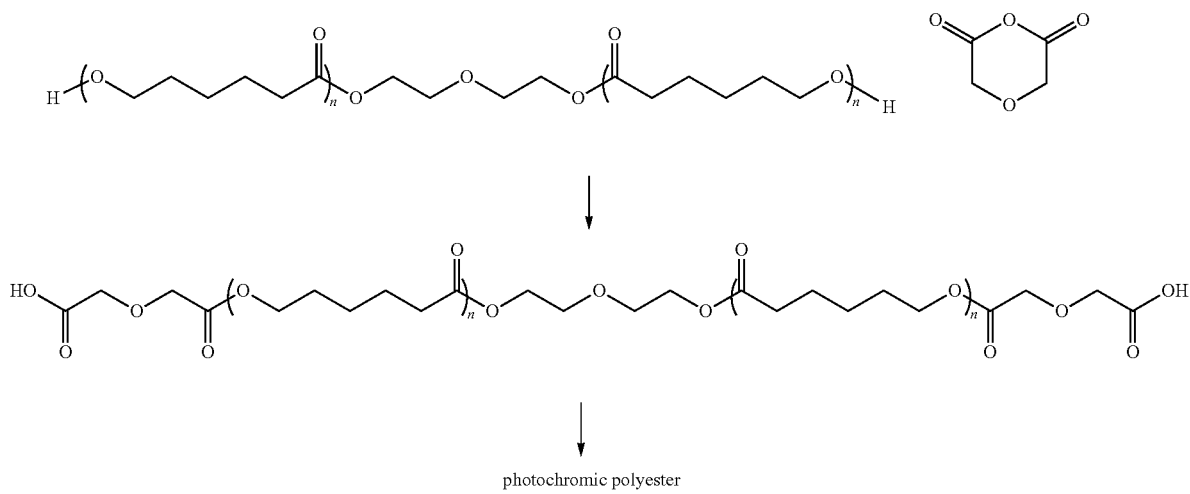
↓
photochromic polyester Scheme 6.4

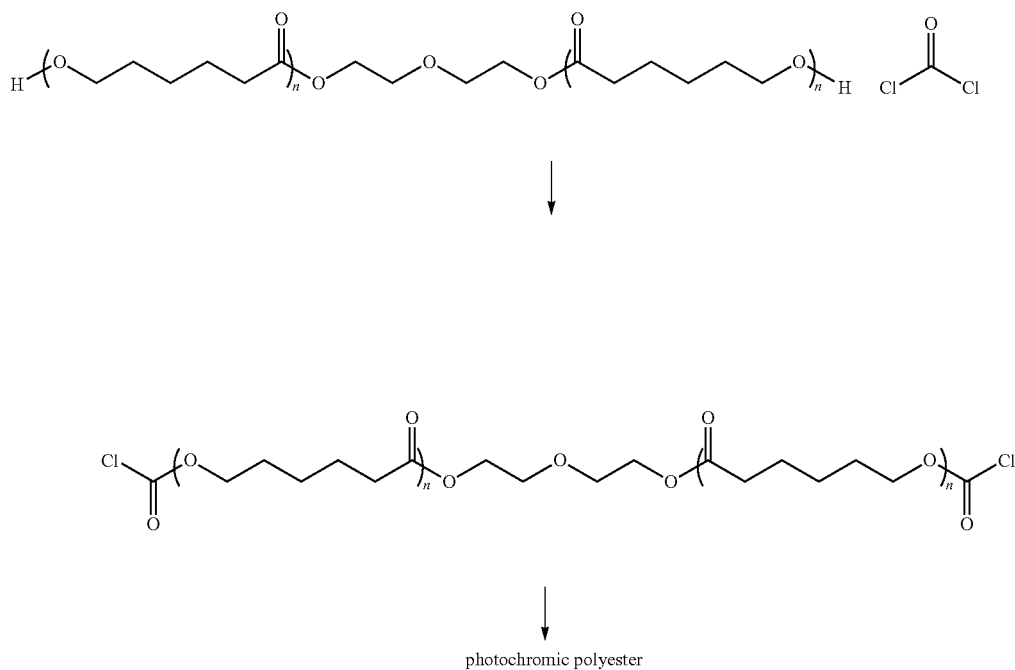

photochromic polyester

Scheme 6.5

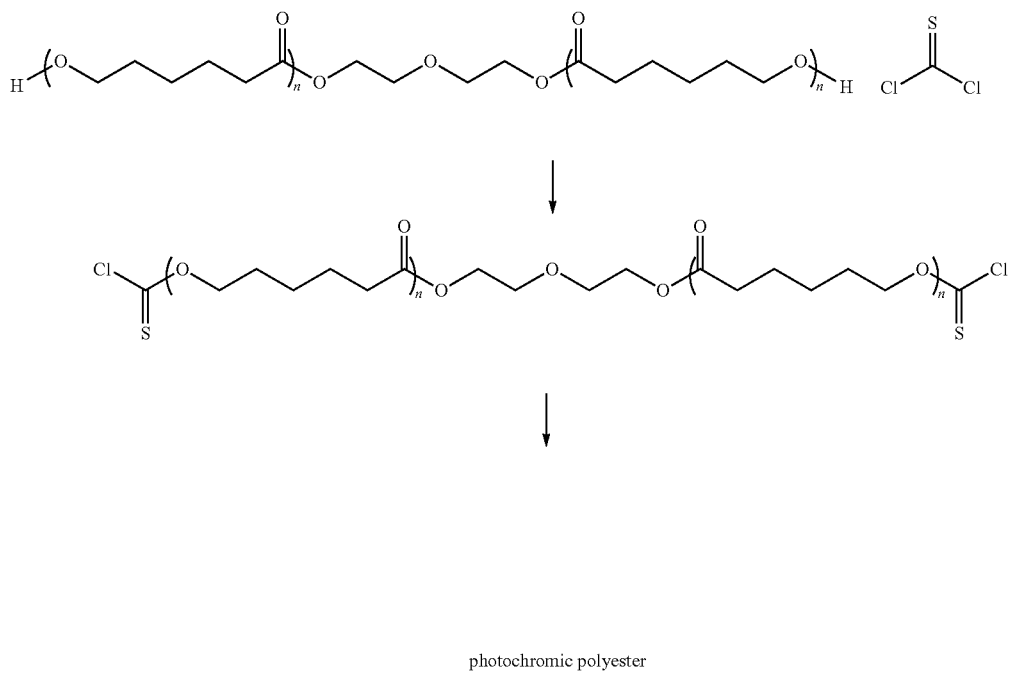

photochromic polyester

Additionally, it is recognised that the photochromic polyesters of the present invention can be prepared in any convenient order. In each of the abovementioned examples, the polymer precursor is functionalised with a suitable linker ($L^a$), and the functionalised precursor is subsequently reacted with a desired photochromic dye. However, it is recognised that the dye may initially be reacted with a suitable linker, and the dye-linker moiety may subsequently be reacted with a desired polymer to provide a photochromic polyester of the present invention. Examples initially reacting specific linkers ($L^a$) with a photochromic dye and subsequently, with a polymer precursor are provided below in Scheme 7.1 to 7.5.

Scheme 7.1
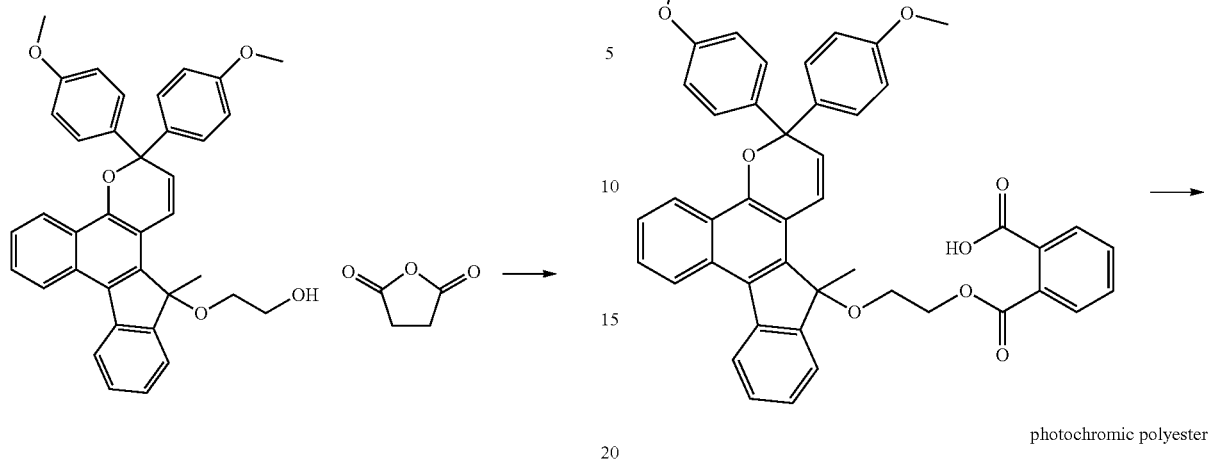
Scheme 7.2
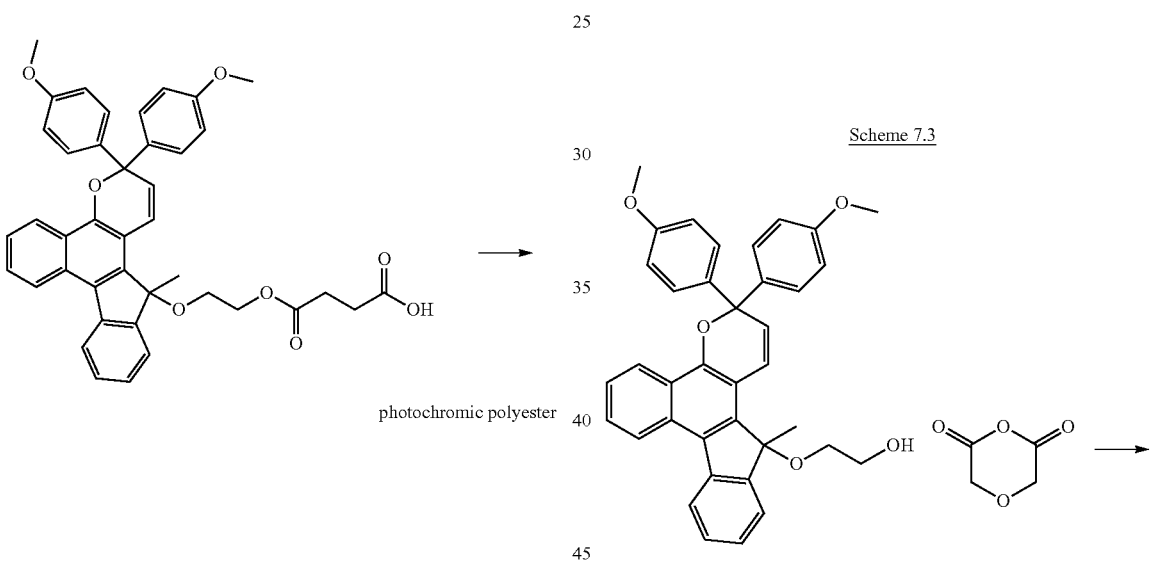
Scheme 7.3
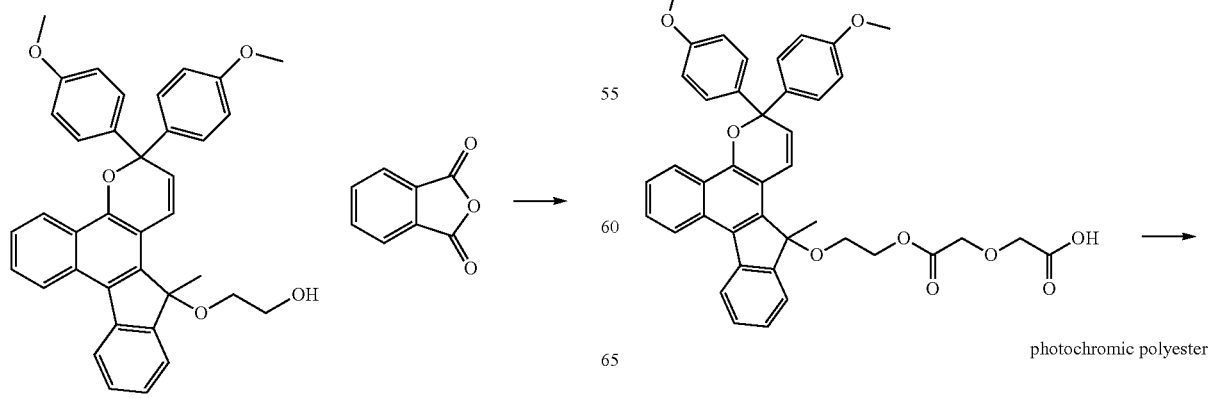

Scheme 7.4

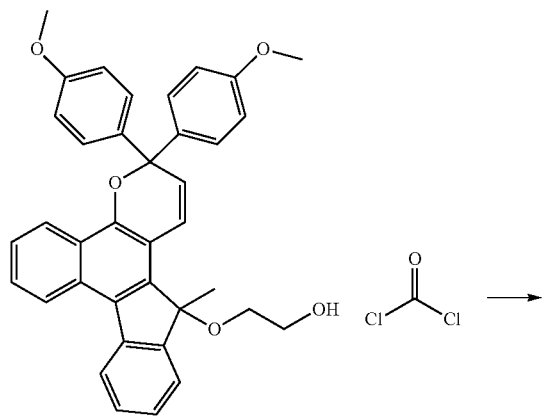

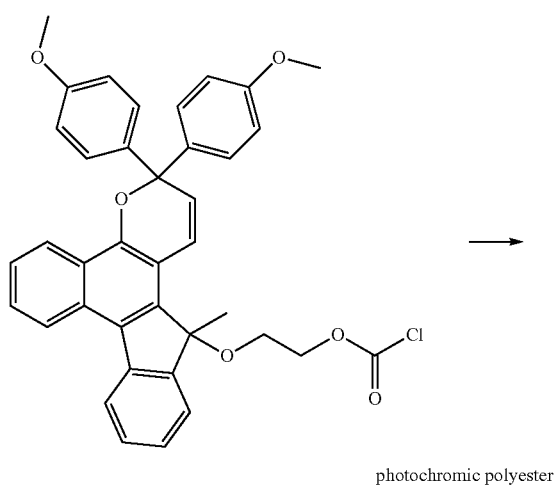

photochromic polyester

Scheme 7.5

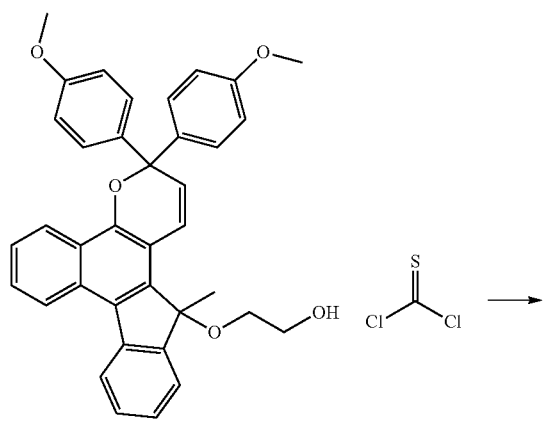

photochromic polyester

The photochromic polymers preferably have a Tg (glass transition temperature) of less than 25° C., more preferably less than 0° C. and still more preferably a temperature less than minus 25° C. (−25° C.).

In one embodiment the photochromic is incorporated into a polymer resin or polymer resin precursor. The photochromic polymer may be incorporated into a polymer matrix under a range of curing conditions which will be readily appreciated by those skilled in the art having regard to the compositions disclosed above. Typical curing conditions may involve the use of suitable catalysts and or sensitisers. Examples of curing conditions include thermal curing and photopolymerisation. Monomer compositions of the present invention may be applied to a substrate to be rendered photochromic by coating (and subsequent curing) or the compositions may be shaped, for example by casting before thermal or radiation curing. Solvents or carriers may be used to facilitate application of the monomer composition as a coating. Typically the VOC (volatile organic solvent component) will comprise from 0 to 50% by weight of the composition.

The polymerisable composition according to the present invention may include a polymerisation curing agent.

The polymerisation curing agent may be selected from one or more of a UV curable (photo) initiator, radical heat cationic or radical initiator. UV photoinitiation and thermal initiation are preferred. The compositions may be cured by a combination of UV radiation and heat.

The amount of curing agent may vary with the monomers selected. It has been possible to operate with a relatively low level of curing agent of between approximately 0.05 and 4%, preferably 0.05% to 3.0% by weight.

Suitable curing agents may be selected from the group consisting of azodiisobutyronitrile, AIBN (azo radical heat initiator), 2,2'-azobis(N,N'-dimethyleneisobutyramidine)dihydrochloride, 2,2'-azobis(2-amidinopropane)-dihydrochloride, 2,2'-azobis(N,N'-dimethyleneisobutyramidine), 4,4'-azobis(4-cyanopentanoic acid), 2,2'-azobis{2-methyl-N-[1,1-bis(hydroxymethyl)-2-hydroxyethyl]propionamide}, 2,2'-azobis{2-methyl-N-[1,1-bis(hydroxymethyl)-ethyl] propionamide}, 2,2'-azobis[2-methyl-N-(2-hydroxyethyl) propionamide], 2,2'-azobis(isobutyramide)dihydrate, 2,2'-azobis(4-methoxy-2,4-dimethylvaleronitrile), 2,2'-azobis(2,4-dimethylvaleronitrile), 2,2'-azobisisobutyronitrile, dimethyl 2,2' azobisisobutyrate, 2,2'-azobis(2-methyl-butyronitrile), 1,1'-azobis(1-cyclohexanecarbonitrile), 2-(carbamoylazo)-isobutyronitrile, 2,2'-azobis(2,4,4-trimethylpentane), 2-phenylazo-2,4-dimethyl-4-methoxyvaleronitrile, 2,2'-azobis(2-methylpropane), Trigonox TX-29 (dialkyl peroxide radical heat initiator), 1,1-di-(-butyl peroxy-3,3,5-trimethyl cyclohexane), TBPEH (alkyl perester radical heat initiator), t-butyl per-2-ethylhexanoate (diacyl peroxide radical heat initiator), benzoyl peroxide, (peroxy dicarbonate radical heat initiator), ethyl hexyl percarbonate (ketone peroxide radical heat initiator), methyl ethyl ketone peroxide, "Cyracure UV1-6974" (cationic photoinitiator), triaryl sulfonium hexafluoroantimonate, Lucirin TPO (radical photoinitiator), 2,4,6-trimethylbenzoyidiphenylphosphine oxide, Irgacure 819, bis(2,4,6-trimethylbenzoyl)-phenyl-phosphine oxide, 1-bis(2,6-dimethoxybenzoyl)-2,4,4-trimethylpentyl phosphineoxide, Vicure 55 (radical photoinitiator), methyl phenylglycoxylate, bis(t-butylperoxide)-diisopropylbenzene, t-butyl perbenzoate, t-butyl peroxy neodecanoate, Amicure DBU, Amicure BDMA, DABCO, polycat SA-1, polycat SA-102, polycat SA-610/50, aluminium acetyl acetonate, dibutyltin dilaurate, dibutyltin oxide, Darocur 1173, Irgacure 184, Irgacure 500, Irgacure 1800 and Irgacure 1850.

Other additives may be present which are conventionally used in coating compositions such as inhibitors, surfactants, UV absorbers, stabilisers and materials capable of modifying refractive index. Such additives may be selected from the group consisting of leveling agents including 3M FC 430 and 3M FC 431.

Examples of surfactants include, fluorinated surfactants or polydimethyl siloxane surfactants such as FC430, FC431 made by 3M, BYK300, BYK371 made by Mallinckrodt, SF-1066, SF-1141 and SF-1188 made by General Electric Company, L-540, L-538 sold by Union Carbide and DC-190 sold by Dow Corning.

Examples of UV absorbers include Ciba Tinuvin P-2(2'-hydroxy-5'methyl phenyl)benzotriazole, Cyanamid Cyasorb UV 531-2-hydroxy-4-noctoxybenzophenone, Cyanamid Cyasorb UV5411-2(2-hydroxy-5-t-octylphenyl)-benzotriazole, Cyanamid UV 2098-2 hydroxy-4-(2-acryloyloxyethoxy) benzophenone, National Starch and Chemicals Permasorb MA-2 hydroxy-4-(2 hydroxy-3-methacryloxy)propoxy benzophenone, Cyanamid UV24-2,2'-dihydroxy-4-methoxybenzophenone, BASF UVINUL 400-2,4 dihydroxy-benzophenone, BASF UVINUL D-49-2,2'-dihydroxy-4,4' dimethoxy-benzophenone, BASF UVINUL D-50-2,2',4,4' tetrahydroxy benzophenone, BASF UVINUL D-35-ethyl-2-cyano-3,3-diphenyl acrylate, BASF UVINUL N-539-2-ethylhexyl-2-cyano-3,3-diphenyl acrylate, Ciba Geigy Tinuvin 213.

Examples of stabilisers include hydroquinone, coating Solution Stabilizers, nitroso compounds such as Q1301 and Q1300 from Wako Hindered Amine Light Stabilisers (HALS), Including, Ciba Tinuvin765/292bis(1,2,2,6,6)pentamethyl-4-piperidyl)sebacate, Ciba Tinuvin 770-bis(2,2,6,6-tetramethyl-4-piperidinyl)-sebacate.

Examples of antioxidants include Ciba Irganox 245-triethylene glycol-bis-3-(3-tertbutyl-4-hydroxy-5-methyl phenyl) propionate, Irganox 1010-2,2-bis[[3-[3,4-bis(1,1-dimethylethyl)-4-hydroxyphenyl[-1-oxopropoxy]methyl]-1,3-propanediyl 3,5-bis(1,1-dimethyl ethyl)-4-hydroxy benzene propanoate, Irganox 1076-octadecyl 3-(3',5'-ditert-butyl(-4'-hydroxyphenyl)propionate, hydroquinone, BHT, TBC, MEHQ (4-methoxyphenone), 2-ethoxy-5-(propenyl)phenol, Isoeugenol, 2-allyl phenol, butylated hydroxyanisole.

Examples of anticolouring agents include 10 dihydro-9-oxa-10-phosphaphenanthrene-1-oxide.

Examples of cure modifiers include dodecyl mercaptan, butyl mercaptan, thiophenol.

Examples of nitroso compounds include Q1301 from Wako Nofmer from Nippon Oils and Fats.

Other additives can be present such as viscosity modifiers, and include monomers such as methacrylic acid, vinyl silanes, and other functional monomers. Other monomeric additives may be included to improve processing and/or material properties, these include: methacrylic acid, maleic anhydride, acrylic acid dye-enhancing, pH-adjusting monomers like Alcolac SIPOMER 2MIM a charge-reducing cationic monomer to render the material more antistatic, example Sipomer Q5-80 or Q9-75.

The composition according to the present invention may be utilised in the reparation of a coated optical article or may be used in casting optical articles.

In a preferred aspect the cured composition exhibits improved scratch resistance when compared with corresponding photochromic articles of comparable fade speed.

The composition of an optical coating may be tailored so that its refractive index substantially matches that of the optical article. The coating may have a thickness in the range of approximately 0.1 to 100 micron (µm).

When the primer coating includes a dye component the primer coating is applied to at least the front (convex) surface of the optical article.

Alternatively, when the primer coating functions to provide improved impact resistance to the optical article, the primer coating preferably has a thickness of approximately 0.7 to 5 micron.

The optical article may be a camera lens, optical lens element, video disc or the like. An optical lens element is preferred.

By the term "optical lens element" we mean all forms of individual refractive optical bodies employed in the ophthalmic arts, including, but not limited to, lenses, lens wafers and semi-finished lens blanks requiring further finishing to a particular patient's prescription. Also included are formers used in the manufacture of progressive glass lenses and moulds for the casting of progressive lenses in polymeric material.

Where the optical article is an optical lens, the optical lenses may be formed from a variety of different lens materials, and particularly from a number of different polymeric plastic resins. Medium to high index lens materials, e.g. those based on acrylic or allylic versions of bisphenols or allyl phthalates and the like are particularly preferred. Other examples of lens materials that may be suitable for use with the invention include other acrylics, other allylics, styrenics, polycarbonates, vinylics, polyesters and the like. Mid to high index lens materials are particularly preferred.

The utilisation of a coating with a mid to high index optical lens is particularly advantageous in improving the impact resistance of the lens. This is particularly so where an anti-reflective (AR) coating is also included. Such AR coatings may otherwise cause a plastic optical lens to exhibit increased brittleness, for example A common ophthalmic lens material is diethylene glycol bis(allyl carbonate). One such material is CR39 (PPG Industries).

The optical article may be formed from cross-linkable polymeric casting compositions, for example as described in the Applicants U.S. Pat. No. 4,912,155, U.S. patent application Ser. No. 07/781,392, Australian Patent Applications 50581/93 and 50582/93, and European Patent Specification 453159A2, the entire disclosures of which are incorporated herein by reference.

For example, in Australian Patent Application 81216/87, the entire disclosure of which is incorporated herein by reference, the Applicant describes a cross-linkable casting composition including at least polyoxyalkylene oxide diacrylate or dimethacrylate and at least one poly functional unsaturated cross-linking agent.

Further, in Australian Patent Application 75160/91, the entire disclosure of which is incorporated herein by reference, describes a polyoxyalkylene oxide diacrylate or dimethacrylate; a monomer including a recurring unit derived from at least one radical-polymerisable bisphenol monomer capable of forming a homopolymer having a high refractive index of more than 1.55; and a urethane monomer having 2 to 6 terminal groups selected from a group comprising acrylic and methacrylic groups.

The polymeric photochromic may be incorporated in the polymer matrix in the process of the present invention by being mixed with a polymerisable monomeric composition that, upon curing produces a solid polymeric composition of Tg typically above 30° C. preferably at least 50° C., still more preferably at least 70° C. and most preferably at least 80° C. The polymerisable composition can be cast as a film, sheet or lens, or injection moulded or otherwise formed into a sheet or lens. Preferably the article will be optically transparent;

The photochromic polymer composition may also be applied to the surface of a material by any convenient manner, such as spraying, brushing, spin-coating or dip-coating from a solution or dispersion of the photochromic material in the presence of a polymeric binder. For example the polymerizable composition (which may be) partly cured) can be dissolved or dispersed in a solvent which can be applied to the surface of a substrate in the form of a permanent adherent film or coating by any suitable technique such as spraying, brushing, spin-coating or dip-coating;

The photochromic polymer composition can be cast or coated onto a substrate by the above mentioned methods and placed within a host material as a discrete layer intermediate to adjacent layers of a host material(s);

The photochromic polymer composition of the invention may be incorporated into a composition by ball milling with a carrier to disperse it in a reactive binder matrix. Such a composition may be used as an ink in ink jet printing and suitable (PC) moieties may be chosen to allow security markings on documents to be visible in exposure to UV light used in photocopy;

The photochromic polymer may be compounded with suitable resins and the resin polymerized with the dye monomer before, during or after being injection moulded to shape it to form a film, for example by blow moulding or to form more complex shaped extruded and/or blown structures.

Examples of host matrix into which the photochromic polymer may be incorporated include homopolymers and copolymers of polyol(allyl carbonate) monomers, homopolymers and copolymers of polyfunctional acrylate monomers, polyacrylates, poly(alkylacrylates) such as poly(methylmethacrylate), cellulose acetate, cellulose triacetate, cellulose acetate propionate, cellulose acetate butyrate, poly(vinyl acetate), poly(vinylalcohol), poly(vinylchloride), poly(vinylidene chloride), polyurethanes, polycarbonates, poly(ethylene-terephthalate), polystyrene, copoly(styrene-methylmethacrylate), copoly(styrene-acrylateonitrile), poly(vinylbutyral), and homopolymers and copolymers of diacylidene pentaerythritol, particularly copolymers with polyol(allylcarbonate) monomers, e.g. diethylene glycol bis (allyl carbonate), and acrylate monomers. Transparent copolymers and blends of the transparent polymers are also suitable as host materials.

The resulting matrix material may be an optically clear polymerized organic material prepared from a polycarbonate resin, such as the carbonate-linked resin derived from bisphenol A and phosgene which is sold under the trademark LEXAN; a poly(methylmethacrylate), such as the material sold under the trademark PLEXIGLAS; polymerizates of a polyol(allyl carbonate), especially diethylene glycol bis(allyl carbonate), which is sold under the trademark CR-39, and its copolymers such as copolymers with vinyl acetate, e.g. copolymers of from about 80-90 percent diethylene glycol bis(allyl carbonate) and 10-20 percent vinyl acetate, particularly 80-85 percent of the bis(allyl carbonate) and 15-20 percent vinyl acetate, cellulose acetate, cellulose propionate, cellulose butyrate, polystyrene and copolymers of styrene with methyl methacrylate, vinyl acetate and acrylonitrile, and cellulose acetate butyrate.

Polyol (allyl carbonate) monomers which can be polymerised to form a transparent host material are the allyl carbonates of linear or branched aliphatic glycol bis(allyl carbonate) compounds, or alkylidene bisphenol bis(allyl carbonate) compounds. These monomers can be described as unsaturated polycarbonates of polyols, eg glycols. The monomers can be prepared by procedures well known in the art, e.g., U.S. Pat. Nos. 2,370,567 and 2,403,113. The polyol (allyl carbonate) monomers can be represented by the graphic formula:

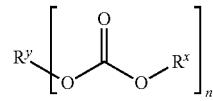

wherein $R^x$ is the radical derived from an unsaturated alcohol and is commonly an allyl or substituted allyl group, $R^y$ is the radical derived from the polyol, and n is a whole number from 2-5, preferably 2. The allyl group ($R^x$) can be substituted at the 2 position with a halogen, most notably chlorine or bromine, or an alkyl group containing from 1 to 4 carbon atoms, generally a methyl or ethyl group. The $R^x$ group can be represented by the graphic formula:

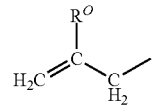

wherein $R^O$ is hydrogen, halogen, or a $C_{1-4}$ alkyl group. Specific examples of $R^x$ include the groups: allyl, 2-chloroallyl, 2-bromoallyl, 2-fluorallyl, 2-methylallyl, 2-ethylallyl, 2-isopropylallyl, 2-n-propylallyl, and 2-n-butylallyl. Most commonly $R^x$ is the allyl group:

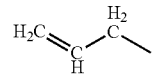

$R^y$ is the polyvalent radical derived from the polyol, which can be an aliphatic or aromatic polyol that contains 2, 3, 4 or 5 hydroxy groups. Typically, the polyol contains 2 hydroxy groups, i.e. a glycol or bisphenol. The aliphatic polyol can be linear or branched and contain from 2 to 10 carbon atoms. Commonly, the aliphatic polyol is an alkylene glycol having from 2 to 4 carbon atoms or a poly($C_{2-4}$)alkylene glycol, i.e. ethylene glycol, propylene glycol, trimethylene glycol, tetramethylene glycol, or diethylene glycol, triethylene glycol etc.

In a further embodiment, the invention provides a photochromic article comprising a polymeric organic host material selected from the group consisting of poly(methyl methacrylate), poly(ethylene glycol bismethacrylate), poly(ethoxylated bisphenol A dimethacrylate) thermoplastic polycarbonate, poly(vinyl acetate), polyvinylbutyral, polyurethane, and polymers of members of the group consisting of diethylene glyco bi(allylcarbonate) monomers, diethylene glycol dimethacrylate monomers, ethoxylated phenol bismethylacrylate monomers, diisopropenyl benzene monomers and ethoxylated trimethylol propane triacrylate monomers, and a photochromic polymer covalently tethered to the matrix via a terminal group reactive with the host.

The polymeric matrix material is selected from the group consisting of polyacrylates, polymethacrylates, poly($C_{1-12}$) alkyl methacrylates, polyoxy(alkylene methacrylates), poly (alkoxylates phenol methacrylates), cellulose acetates, cellulose triacetate, cellulose acetate propionate, cellulose acetate butyrate, poly(vinyl acetate), poly(vinyl alcohol), poly(vinyl chloride) poly(vinylidene chloride), thermoplastic polycarbonates, polyesters, polyurethanes, polythiourethanes, poly (ethylene terephthalate), polystyrene, poly(alpha methylstyrene), copoly(styrenemethylmethacrylate), copoly(styreneacrylonitrile), polyvinylbutyral and polymers of members of the group consisting of polyol(allyl carbonate) monomers, polyfunctional acrylate monomers, polyfunctional methylacrylate monomers, diethylene glycol dimethacrylate monomers, diisopropenyl benzene monomers, alkoxylated polyhydric alcohol monomers and diallylidene pentaerythritol monomers.

The polymerizable composition of the invention may be in the form of a coating or adhesive and may comprise a binder resin and crosslinker. Binders are primarily responsible for the quality of a paint or lacquer coating. Examples of binders include alkyds, polyesters, amino resins such as melamine formaldehyde, acrylics, epoxies and urethanes. The binder may be thermoplastic or thermosetting in character and max be of molecular weight from 500 to several million. Coating comprising the polymerizable composition of the invention may include a solvent to adjust the viscosity. The viscosity may for example be in the range of from 0.5 to 10 Ps.

Pigments and fillers may be used to confer opacity or colour. A coating composition based on the composition of the invention may utilise a range of crosslinking systems such as polyisocyanates for cross linking active hydrogen functional groups such as hydroxy and amine; epoxy/acid; epoxy amine and carbamate melamine. The coating composition may be in two pack form, for example one pack comprising the cross linking agent and another pack comprising a binder, a dye monomer as hereinbefore described and optionally further components such as solvents, pigments, fillers and formulation aids.

The terminal reactive group of the polymerizable composition and the binder component may both comprise groups such as hydroxy, amine, alkylamine, chlorosilane, alkoxy silane epoxy unsaturated, isocyanato and carboxyl for reacting with a monomer component on curing.

In this embodiment one pack comprises the binder component and the other the cross-linker. Typically the binder component will comprise 50 to 90% by weight of the coating composition (more preferably 65 to 90%) and the crosslinker components will comprise from 10 to 50% by weight of the coating composition.

Preferred hydroxyl moieties in the binder component are derived from hydroxyl monomers, such as hydroxy alkyl acrylates and (meth)acrylates wherein the alkyl group has the range of 1 to 4 carbon atoms in the alkyl group. Exemplars include hydroxy ethyl(meth)acrylate, hydroxy propyl(meth) acrylate, hydroxy butyl(meth)acrylate or a combination thereof.

The monomer mixture which may be used in preparation of an acrylic binder preferably includes one or more monomers selected from alkyl acrylates and corresponding (meth)acrylates having 1-18 carbon atoms in the alkyl group, such as methyl(meth)acrylate, ethyl(meth)acrylate, propyl(meth) acrylate, isopropyl(meth)acrylate, butyl(meth)acrylate, pentyl(meth)acrylate, hexyl(meth)acrylate, 2-ethyl hexyl(meth) acrylate, nonyl(meth)acrylate, lauryl(meth)acrylate, stearyl (meth)acrylate; cycloaliphatic(meth)acrylates, such as trimethylcyclohexyl(meth)acrylate, and isobutylcyclohexyl(meth)acrylate; aryl(meth)acrylates, such as benzyl(meth) acrylate; isobornyl(meth)acrylate; cyclohexyl(meth)acrylate; glycidyl(meth)acrylate; ethyl hexyl(meth)acrylate, benzyl(meth)acrylate or a combination thereof. Methacrylates of methyl, butyl, n-butyl, and isobornyl are preferred. Other monomers such as styrene, alkyl styrene, vinyl toluene and acrylonitrile may be used in addition.

Amine moieties where directed may be provided by alkyl amino alkyl(meth)acrylates such as tert-butylaminoethyl methacrylate.

The crosslinking component of the coating composition of the present invention preferably includes one or more crosslinking agents having at least two isocyanate groups, such as a polyisocyanate crosslinking agent. Any of the conventional aromatic, aliphatic, cycloaliphatic, isocyanates, trifunctional isocyanates and isocyanate functional adducts of a polyol and a diisocyanate can be used. Typically useful diisocyanates are 1,6-hexamethylene diisocyanate, isophorone diisocyanate, 4,4'-biphenylene diisocyanate, toluene diisocyanate, bis cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene diisocyanate, bis(4-isocyanatocyclohexyl)-methane and 4,4-diisocyanatodiphenyl ether. Prepolymerised forms of these isocyanates are also commonly used to reduce potential exposure hazard of volatile form.

The photochromic article may comprise a polymeric organic material which is a homopolymer or copolymer of monomer(s) selected from the group consisting of acrylates, methacrylates, methyl methacrylate, ethylene glycol bis methacrylate, ethoxylated bisphenol A dimethacrylate, vinyl acetate, vinylbutyral, urethane, thiourethane, diethylene glycol bis(allyl carbonate), diethylene glycol dimethacrylate, diisopropenyl benzene, and ethoxylated trimethyl propane triacrylates.

The photochromic composition of the invention may contain the photochromic compound in a wide range of concentrations depending on the type of photochromic moiety and its intended application. For example in the case of inks in which high colour intensity is required a relatively high concentration of up to 30 wt % photochromic may be required. On the other hand it may be desirable in some cases such as optical articles to use photochromics in very low concentrations to provide a relatively slight change in optical transparency on irradiation. For example, as low as 0.01 mg/g of matrix may be used. Generally the photochromic resin will be present in an amount of from 0.01 mg/g of matrix up to 30 wt % of host matrix. More preferably the photochromic compound will be present in an amount of from 0.01 mg/g to 100 mg/g of host matrix and still more preferably from 0.05 mg/g to 100 mg/g of host matrix.

The photochromic article may contain the photochromic compound in an amount of from 0.01 to 10.0 milligram per square centimeter of polymeric organic host material surface to which the photochromic substance(s) is incorporated or applied.

The dye monomers and polymerizable compositions of the invention may be used in those applications in which the organic photochromic substances may be employed, such as optical lenses, e.g., vision correcting ophthalmic lenses and plano lenses, face shields, goggles, visors, camera lenses, windows, automotive windshields, aircraft and automotive transparencies, e.g., T-roofs, sidelights and backlights, plastic films and sheets, textiles and coatings, e.g. coating compositions. The dye monomers and photochromic compositions may also be used as a means of light activated date storage. As used herein, coating compositions include polymeric coating composition prepared from materials such as polyurethanes, epoxy resins and other resins used to produce synthetic polymers; paints, i.e., a pigmented liquid or paste used for the decoration, protection and/or the identification of a substrate; and inks, i.e., a pigmented liquid or paste used for writing and printing on substrates, which include paper, glass, ceramics, wood, masonry, textiles, metals and polymeric organic materials. Coating compositions may be used to produce verification marks on security documents, e.g. documents such as banknotes, passport and driver' licenses, for which authentication or verification of authenticity may be desired.

Throughout the specification and claims terms are used in the definition of chemical groups and substituents which unless a contrary intent is indicated have the meanings referred to below.

"Alkyl" as a group or part of a group refers to a straight or branched aliphatic hydrocarbon group, of for example one to twenty carbon atoms, preferably a $C_1$-$C_{10}$ alkyl, most preferably $C_1$-$C_6$ alkyl unless otherwise noted. Examples of suitable straight and branched $C_1$-$C_6$ alkyl substituents include methyl, ethyl, n-propyl, 2-propyl, n-butyl, sec-butyl, t-butyl, hexyl, and the like. The group may be a terminal group or a bridging group where the context provides.

"Alkyloxy" and "alkoxy" refer to an alkyl-O-group in which alkyl is as defined herein. Preferably the alkoxy is a $C_1$ to $C_6$ alkoxy. Examples include, but are not limited to, methoxy and ethoxy. The group may be a terminal group or a bridging group.

"Aryl" as a group or part of a group denotes (i) an optionally substituted monocyclic, or fused polycyclic, aromatic carbocycle (ring structure having ring atoms that are all carbon) preferably having from 5 to 12 atoms per ring. Examples of aryl groups include phenyl, naphthyl, and the like; (ii) an optionally substituted partially saturated bicyclic aromatic carbocyclic moiety in which a phenyl and a $C_{5-7}$ cycloalkyl or $C_{5-7}$ cycloalkenyl group are fused together to form a cyclic structure, such as tetrahydronaphthyl, indenyl or indanyl. The group may be a terminal group or a bridging group. Typically an aryl group is a $C_6$-$C_8$ aryl group and most preferably is phenyl.

A "bond" is a linkage between atoms in a compound or molecule. The bond may be a single bond, a double bond, or a triple bond.

"Acryl" refers to a group of formula RC(O)— where R may be, for example, aryl or alkyl. "Acyloxy" refers to the group of formula RC(O)O— where R is alkyl or aryl.

"Halogen" or "halo" represents chlorine, fluorine, bromine or iodine and most preferably fluorine or chlorine.

"Heteroaryl" either alone or part of a group refers to groups containing an aromatic ring (preferably a 5 or 6 membered aromatic ring) having one or more heteroatoms as ring atoms in the aromatic ring with the remainder of the ring atoms being carbon atoms. Suitable heteroatoms include nitrogen, oxygen and sulphur. Examples of heteroaryl include thiophene, benzothiophene, benzofuran, benzimidazole, benzoxazole, benzothiazole, benzisothiazole, naphtho[2,3-bithiophene, furan, isoindolizine, xantholene, phenoxatine, pyrrole, imidazole, pyrazole, pyridine, pyrazine, pyrimidine, pyridazine, tetrazole, indole, isoindole, 1Hindazole, purine, quinoline, isoquinoline, phthalazine, naphthyridine, quinoxaline, cinnoline, carbazole, phenanthridine, acridine, phenazine, thiazole, isothiazole, phenothiazine, oxazole, isooxazole, furazane, phenoxazine, 2-, 3- or 4-pyridyl, 2-, 3-, 4-, 5-, or 8-quinolyl, 1-, 3-, 4-, or 5-isoquinolinyl 1-, Z-, or 3-indolyl, and 2-, or 3-thienyl. A heteroaryl group is typically a C1-C18 heteroaryl group. The group may be a terminal group or a bridging group.

"Heterocyclic" refers to saturated, partially unsaturated or fully unsaturated monocyclic, bicyclic or polycyclic ring system containing at least one heteroatom selected from the group consisting of nitrogen, sulfur and oxygen as a ring atom.

Examples of heterocyclic moieties include heterocycloalkyl, heterocycloalkenyl and heteroaryl.

The term switching speed refers to the speed of colouration when a photochromic is exposed to light and also to the speed of fade when a coloured photochromic is removed from the light. The term t½ refers to the time taken for the colour to fade to half the intensity when the photochromic article is removed from light. The term t¾ refers to the time taken for the colour to fade by ¾ of the original intensity when the photochromic article is removed from light.

Throughout the description and claims of the specification, the word "comprise" and variations of the word, such as "comprising" and "comprises", is not intended to exclude other additives, components, integers or steps.

EXAMPLES

The invention will now be described with reference to the following examples. It is to be understood that the examples are provided by way of illustration of the invention and that they are in no way limiting to the scope of the invention.

Example 1 and 2

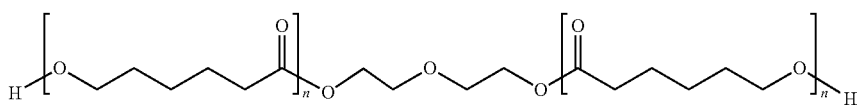

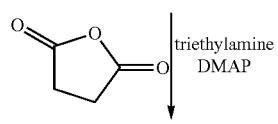
triethylamine
DMAP

-continued

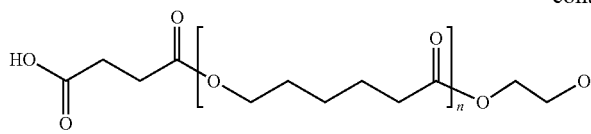 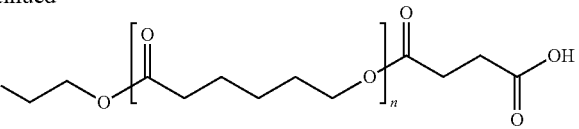

Step 1:

Polycaprolactone diol (1.02 g, average MW=2,000), succinic anhydride (0.153 g), triethylamine (0.21 mL) and 4-dimethylaminopyridine (0.25 g) were combined in dry dichloromethane (ca. 10 mL) under nitrogen and then heated at 35° C. for 2 hours. Poly(ethylene glycol) monomethyl ether (0.18 g, average MW=350) was added and the mixture stirred for an additional 20 minutes. The solvent was evaporated in vacuo and the residue taken up in diethyl ether and washed three times with dilute HCl then brine. The organic layer was dried with $MgSO_4$ and filtered through a plug of silica gel. The solvent was evaporated in vacuo giving the product, polycaprolactone disuccinate, as a waxy solid (0.341 g). A second batch of product was washed from the silica plug with ethyl acetate (0.272 g). Analysis of the first product batch by $^1H$ NMR gave a calculated average molecular weight of 2,560 ($n_{PCL}$=19.8). This material was used in the following step.

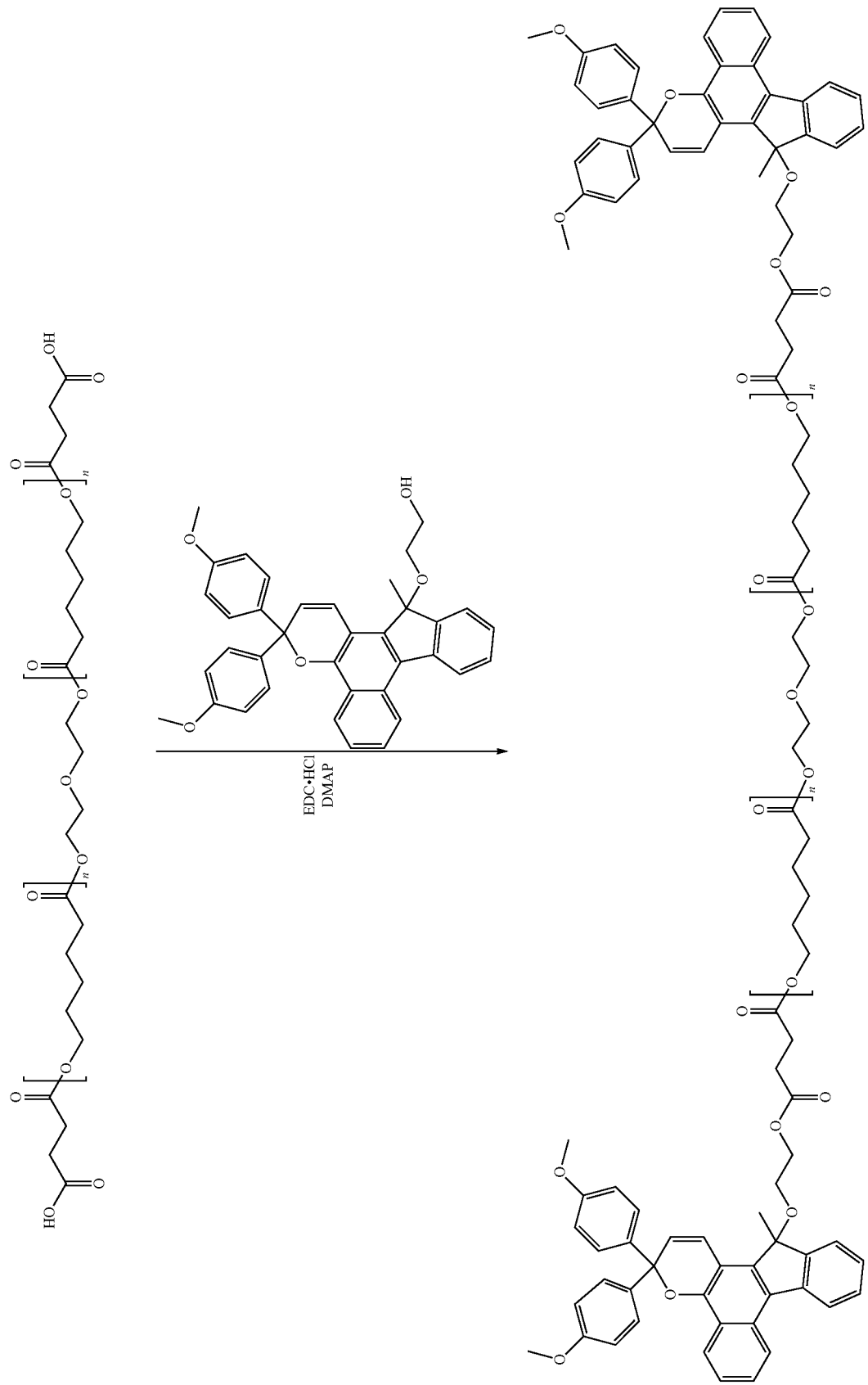

Step 2:

The parent naphthopyran used in this step, 3,3-di(4-methoxyphenyl)-13-hydroxy-13-methyl-indeno[2,1-f]naphtho[1,2-b]pyran, was synthesised using the procedure outlined in U.S. Pat. No. 5,645,767. Its conversion to the 13-(2-hydroxyethoxy) derivative was carried out using the procedure outlined in Malic et al. *Macromolecules,* 2010, 43, 8488.

Polycaprolactone disuccinate (0.315 g, from Step 1), N-(3-dimethylaminopropyl)-N'-ethylcarbodiimide hydrochloride (EDC.HCl) (0.040 g), 4-dimethylaminopyridine (0.017 g) and 3,3-di(4-methoxyphenyl)-13-(2-hydroxyethoxy)-13-methyl-indeno[2,1-f]naphtho[1,2-b]pyran (0.156 g) were combined in dry dichloromethane (ca. 3 mL) under nitrogen and stirred at ambient temperature for 2 hours. The solvent was evaporated in vacuo and the residue purified by column chromatography (silica gel, diethyl ether→ethyl acetate), during which two product fractions were collected from the column.

Fraction 1 (0.048 g) is designated as Example 1 of the invention.

Fraction 2 (0.231 g) is designated as Example 2 of the invention.

Analysis of both fractions by $^1$H NMR confirmed their structure as the naphthopyran end-terminated polycaprolactone conjugates, with average molecular weights of 2,685 ($n_{PCL}$=11.4) and 4,146 ($n_{PCL}$=24.2), respectively, calculated from the integrations of selected resonance peaks of the polymer and naphthopyran end groups.

Example 3

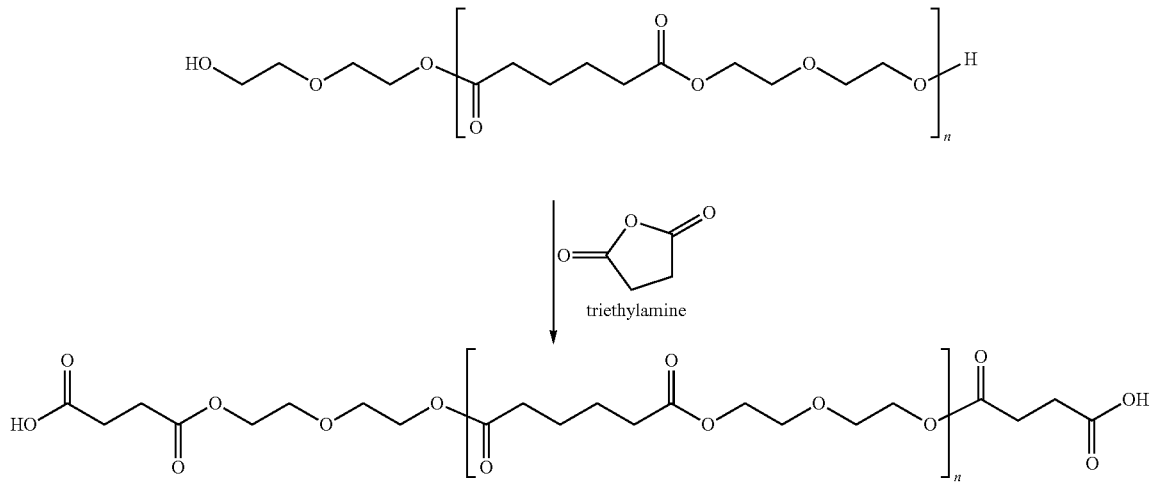

Step 1:

Poly(diethylene glycol adipate) (0.945 g, polyester diol with an average MW=2,761) was combined with succinic anhydride (0.096 g), triethylamine (0.13 mL) and 4-dimethylaminopyridine (0.015 g) in dry dichloromethane (ca. 5 mL) under nitrogen and the mixture heated at 35° C. for 1 hour. Poly(ethylene glycol)-300 (0.096 g) was added and the mixture stirred for an additional 10 minutes. The solvent was evaporated in vacuo, the residue dissolved in EtOAc and washed three times with dilute HCl, then brine. The organic layer was dried with MgSO$_4$, filtered and the solvent evaporated in vacuo giving the product poly(diethylene glycol adipate)disuccinate as a viscous and colourless oil. Analysis by $^1$H NMR (CDCl$_3$) showed the reaction to be complete and gave a calculated average molecular weight of 3,047 ($n_{PDGA}$=12.7) by comparison of the integrations of selected resonance peaks.

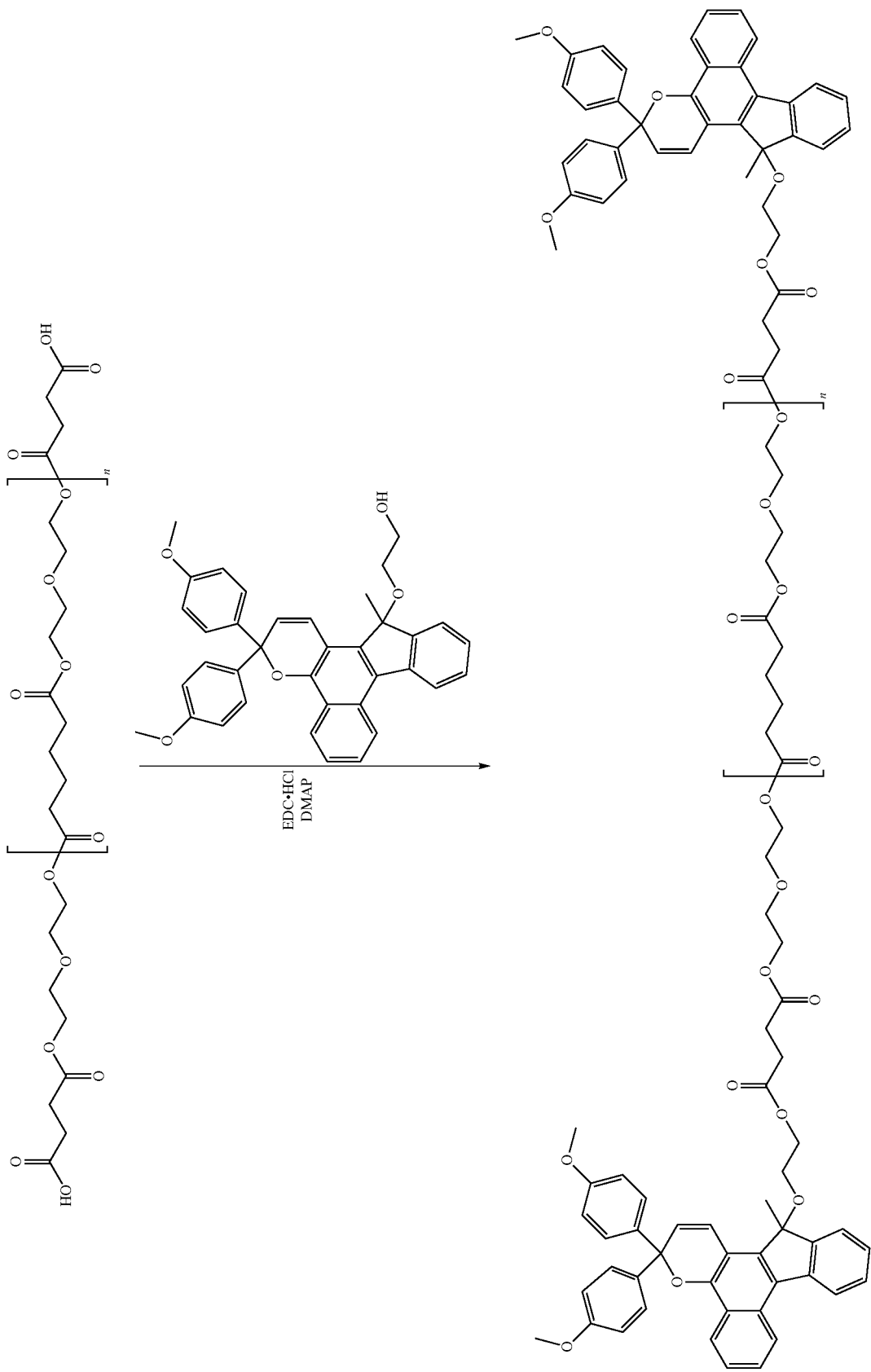

Step 2:

Poly(diethylene glycol adipate)disuccinate (0.274 g, from Step 1) was dissolved in dry dichloromethane (ca. 3 mL) under nitrogen, to which was then added N-(3-dimethylaminopropyl)-N'-ethylcarbodiimide hydrochloride (EDC.HCl) (0.052 g) and 4-dimethylaminopyridine (0.011 g). The mixture was stirred for 5 minutes after which 3,3-di(4-methoxyphenyl)-13-(2-hydroxyethoxy)-13-methyl-indeno[2,1-f]naphtho[1,2-b]pyran (0.10 g, see Example 1 and 2, Step 2) was added as a solid. The reaction mixture was stirred at ambient temperature for 5 hours. The reaction mixture was loaded onto a short silica gel column and eluted with diethyl ether to remove low molecular weight impurities, including any starting naphthopyran. The main product band remained adsorbed onto the silica. The product conjugate was then eluted from the column using EtOAc/10% EtOH and gave a viscous purple coloured tar (0.326 g). Analysis by $^1$H NMR ($d_6$-acetone) showed good product purity and gave a calculated average molecular weight of 4,281 ($n_{PDGA}$=13.4) by comparison of the integrations of selected resonance peaks.

Comparative Example 1

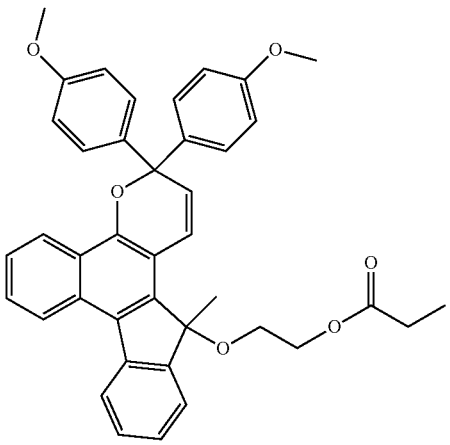

3,3-Di(4-methoxyphenyl)-13-(2-hydroxyethoxy)-13-methyl-indeno[2,1-f]naphtho[1,2-b]pyran (0.10 g, see Example 1, Step 2) was dissolved in dry dichloromethane (ca. 5 mL) under nitrogen, to which was added triethylamine (0.05 mL) followed by propionyl chloride (0.019 mL) via syringe. The mixture was stirred at ambient temperature for 20 minutes after which the solvent was evaporated in vacuo and the residue purified by column chromatography (silica gel, diethyl ether/hexane, 1:1), giving the product as a purple solid (0.087 g). The structure and purity was confirmed by $^1$H NMR analysis.

Photochromic Testing Procedure

Photochromic conjugates outlined in the examples herein and their corresponding comparative examples (controls) were incorporated within a standard thermoset lens matrix formulation composed of 4 parts (by weight) ethoxylated Bisphenol A dimethacrylate (EBPDMA, EO/phenol=1.3), 1 part poly(ethylene glycol) 400 dimethacrylate (PEGDMA) and 0.4 wt % AIBN (radical initiator), at an effective dye concentration of $1.5 \times 10^{-7}$ mol/g. The mixtures were added to a mold and thermally cured in a temperature programmable oven set to raise the temperature from 40° C. to 95° C. at a rate of 12° C./hour and then maintained at 95° C. for 3 hours. The test lenses produced had a thickness of 1.67 mm and were subjected to kinetic testing using a light table comprising a UV-vis spectrophotometer and an external UV light source. The samples were irradiated with filtered UV light (365 nm) for a duration of 900 seconds (15 minutes, coloration) at which point the light source was turned off and the sample was further monitored in the dark (decoloration) for a minimum of 30 minutes. The temperature of the lens samples was maintained at 23° C. in a water bath using a Peltier temperature controller. The resulting change in absorbance during coloration and decoloration was monitored over time at $\lambda_{max}$ (maximum wavelength of absorption of the coloured form of the photochromic compound). Fade speeds of all photochromic compounds herein are expressed as values of $t_{1/2}$ and $t_{3/4}$ which are defined as the time taken for the initial absorbance value (after 15 minutes UV irradiation) to be reduced by half and three quarters, respectively.

TABLE 2.1

Fade-speeds (decolouration) of compounds of the invention and comparative (control) examples.

| Examples | $t_{1/2}$ (sec) | $t_{3/4}$ (sec) |
|---|---|---|
| 1 ($n_{PCL}$ = 11.4) | 43 | 117 |
| 2 ($n_{PCL}$ = 24.2) | 37 | 94 |
| 3 ($n_{PDGA}$ = 13.4) | 41 | 110 |
| CE 1 (propionate control) | 88 | 366 |

$\lambda_{max}$ = 560 nm.

From Table 2.1; it is clear that compounds of the inventions (Examples 1, 2 and 3) undergo faster decolouration than the control dye (CE1) that is electronically identical but not conjugated to the poly(caprolactone). In addition FIG. 1.1 also graphically illustrates the superior colouration and decolouration of Examples 1, 2 and 3 as compared to Comparative Example 1.

The utility of the method is that there are a wide variety of low Tg Polymer esters that can be assessed for conjugated to functional photochromic dye in a straight forward manner.

Photochromic polymer compounds of Examples 30A to 36C shown in Table 3.2 may be prepared in an analogous manner to the photochromic polymers of Examples 1, 2 and 3. In the Examples below, the parent polymer (column 2, Table 3.1), has been functionalised with succinic anhydride to provide a polymer precursor (column 3; Table 3.1; Entry A, B and C). As previously described, the present invention is not limited to a linker ($L^a$) derived from succinic anhydride. The precursors described in Table 3.1, Entries A, B and C; are subsequently reacted with the photochromic identified in Table 3.2 (each numerical example examines a specific photochromic and the polymer adducts with precursor A, B and C).

TABLE 3.1
Selected example polymers
| Entry | Parent polymer |
|---|---|
| A | |
| B | |
| C | |
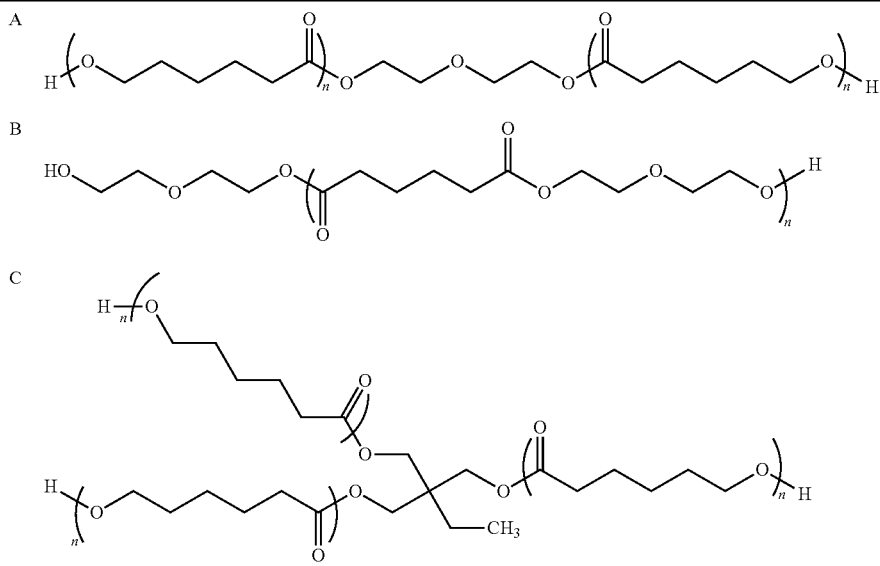
| Entry | Precursor functionalised with succinic anhydride |
|---|---|
| A | |
| B | |
| C | |
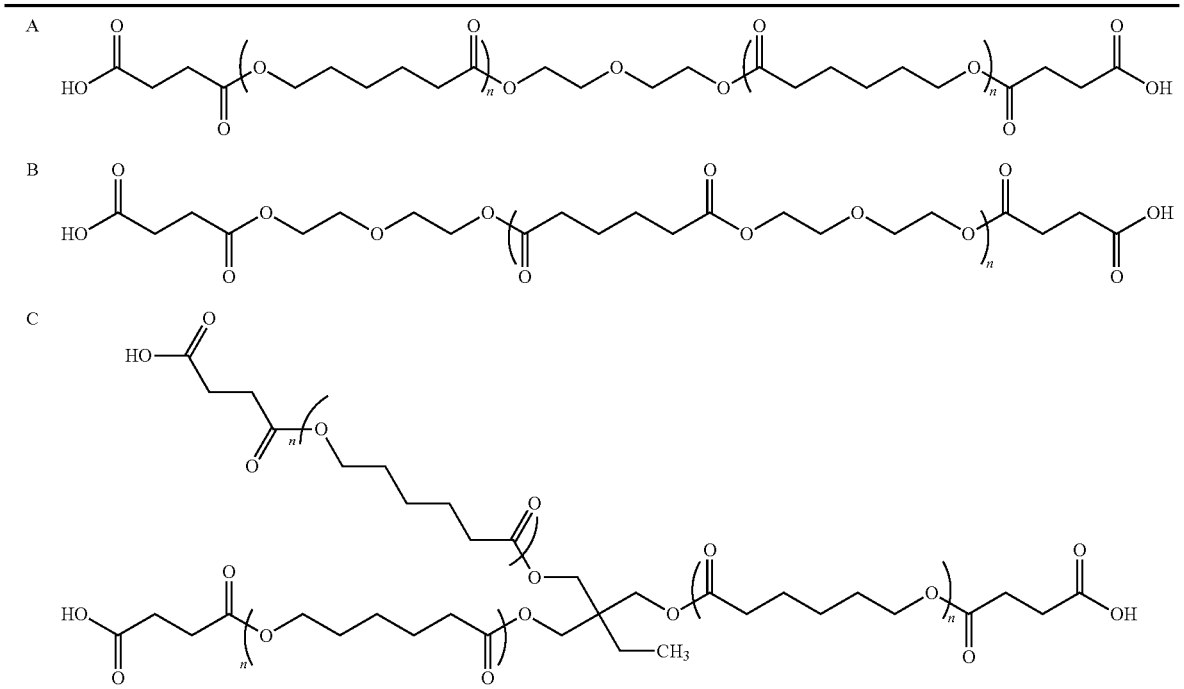

TABLE 3.2

Selected example photochromic polymers

| Entry | Pre PC | Photochromic Polymer |
|---|---|---|
| 30 | A | |

TABLE 3.2-continued
Selected example photochromic polymers
| Entry | Pre PC | Photochromic Polymer |
|---|---|---|
| B | | 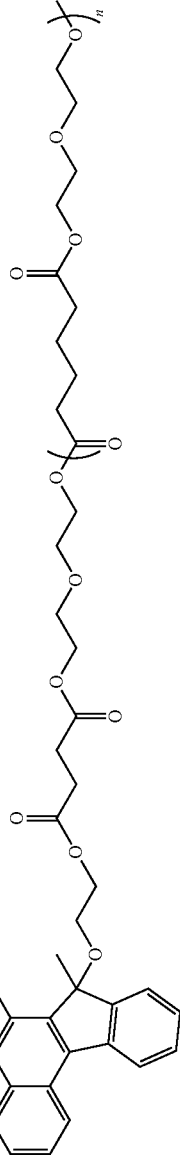 |

TABLE 3.2-continued
Selected example photochromic polymers
| Entry | Pre PC | Photochromic Polymer |
|---|---|---|
| C | | 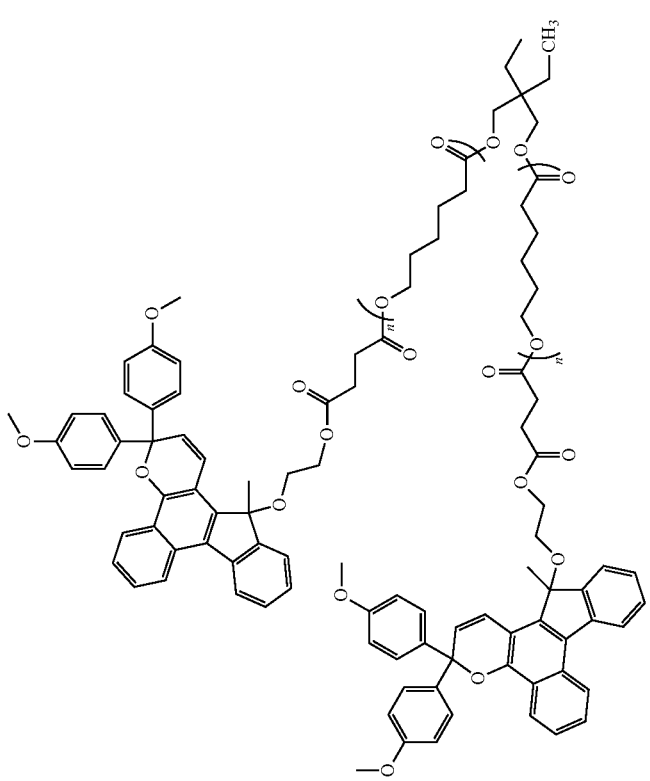 |

TABLE 3.2-continued
Selected example photochromic polymers
| Entry | Pre PC | Photochromic Polymer |
|---|---|---|
| 31 | A<br>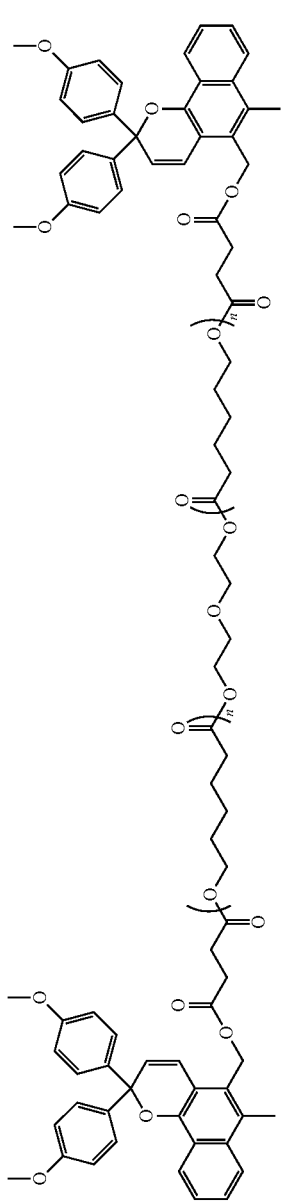  | A<br>B<br>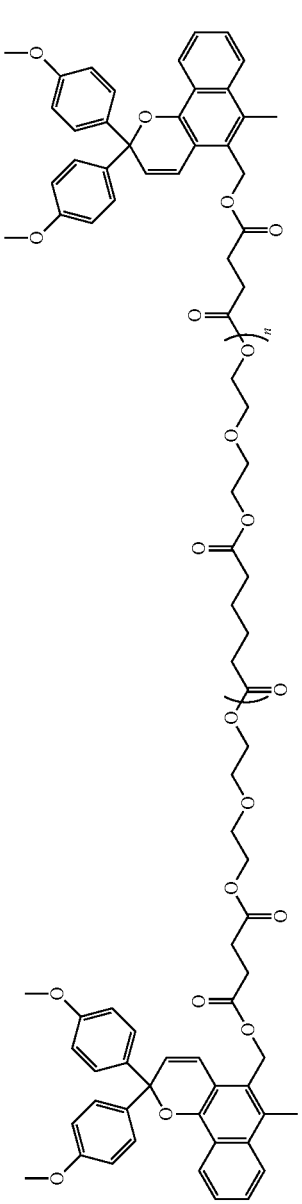 |

TABLE 3.2-continued
Selected example photochromic polymers
| Entry | Pre PC | Photochromic Polymer |
|---|---|---|
| | C | 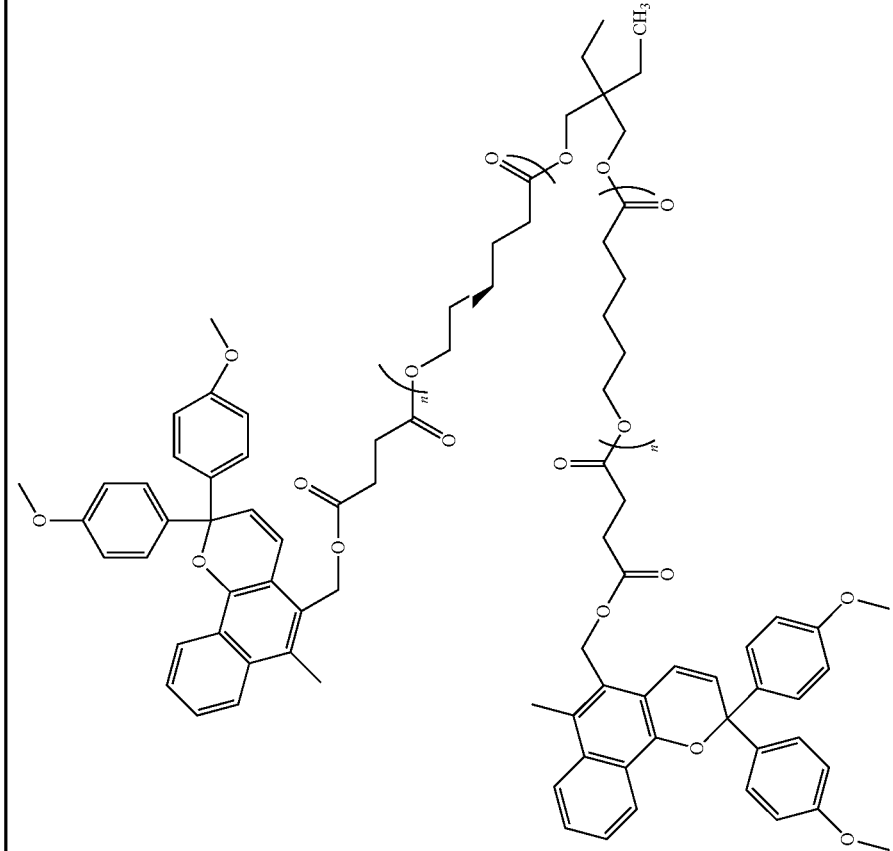 |

TABLE 3.2-continued
Selected example photochromic polymers
| Entry | Pre PC | Photochromic Polymer |
|---|---|---|
| 32 | A | 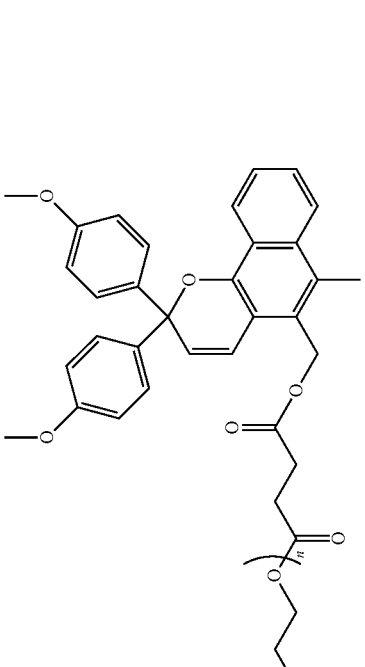 |

TABLE 3.2-continued
Selected example photochromic polymers
| Entry | Pre PC | Photochromic Polymer |
|---|---|---|
| B | | 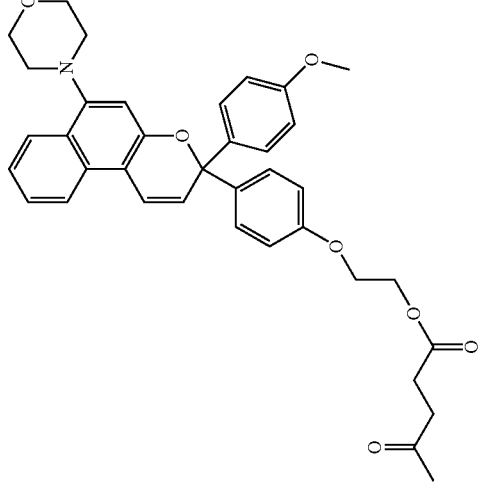 |

TABLE 3.2-continued
Selected example photochromic polymers
| Entry | Pre PC | Photochromic Polymer |
|---|---|---|
| | | 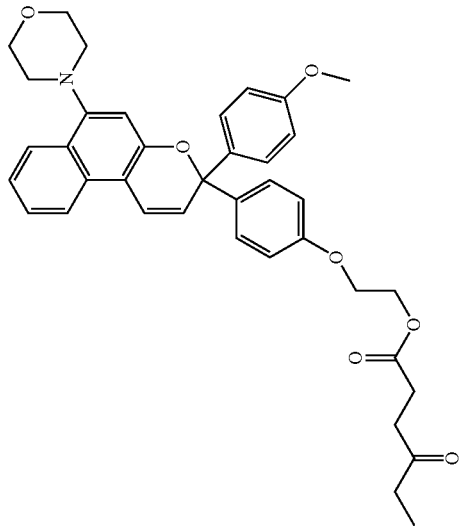 |

TABLE 3.2-continued

Selected example photochromic polymers

| Entry | Pre PC | Photochromic Polymer |
|---|---|---|
| C | | (structures shown) |

TABLE 3.2-continued
Selected example photochromic polymers
| Entry | Pre PC | Photochromic Polymer |
|---|---|---|
| 33 | A | 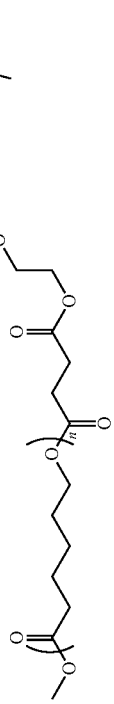 |

TABLE 3.2-continued

Selected example photochromic polymers

| Entry | Pre PC | Photochromic Polymer |
|---|---|---|
| B | | |

TABLE 3.2-continued
Selected example photochromic polymers
| Entry | Pre PC | Photochromic Polymer |
|---|---|---|
| | | 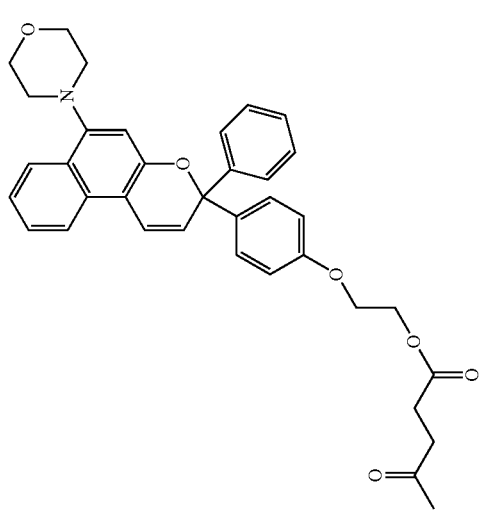 |

TABLE 3.2-continued
Selected example photochromic polymers
| Entry | Pre PC | Photochromic Polymer |
|---|---|---|
| | C | 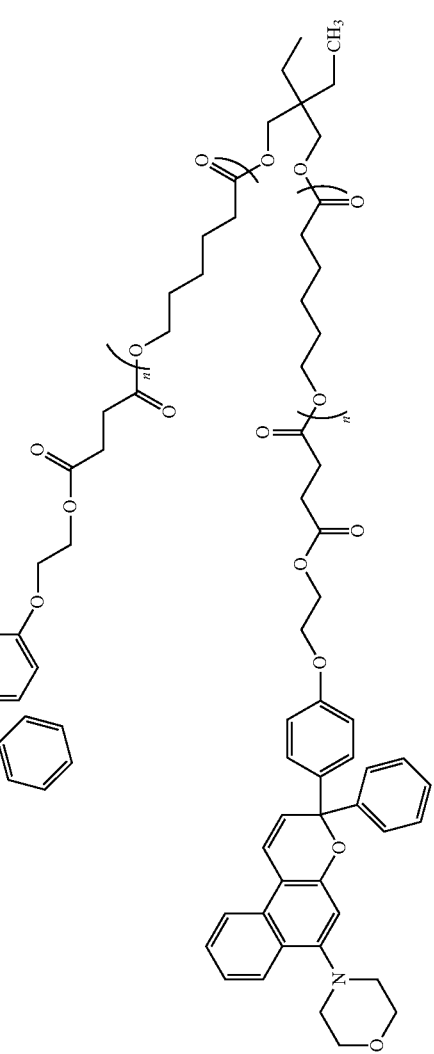 |

TABLE 3.2-continued

Selected example photochromic polymers

| Entry | Pre PC | Photochromic Polymer |
|---|---|---|
| 34 | A | |

TABLE 3.2-continued
Selected example photochromic polymers
| Entry | Pre PC | Photochromic Polymer |
|---|---|---|
| B | | 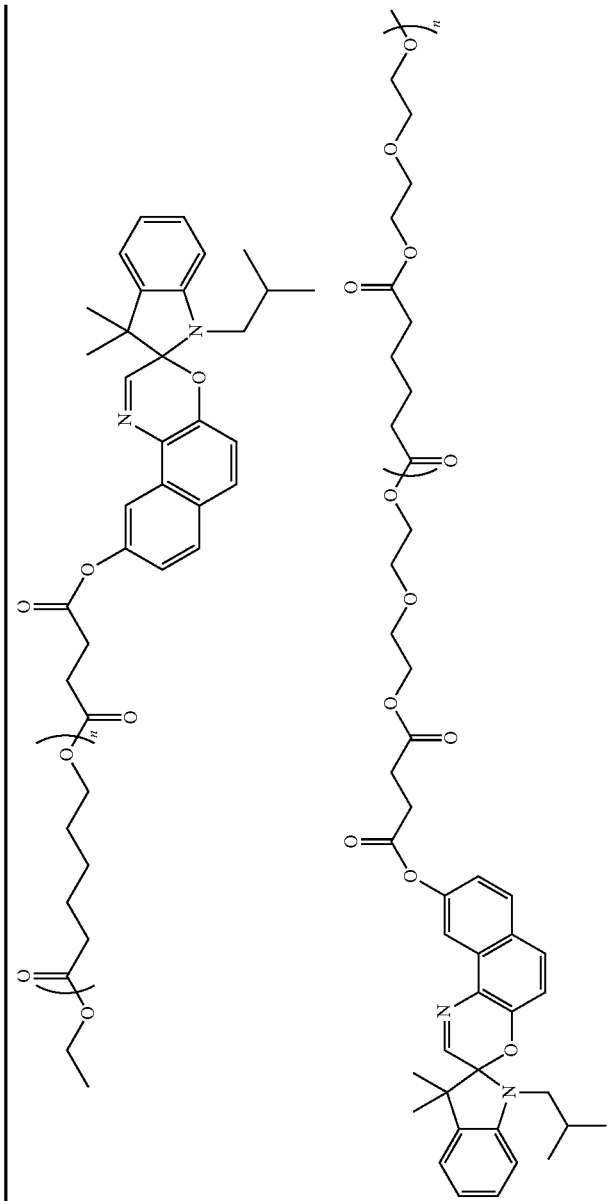 |

TABLE 3.2-continued
Selected example photochromic polymers
| Entry | Pre PC | Photochromic Polymer |
|---|---|---|
| | C | 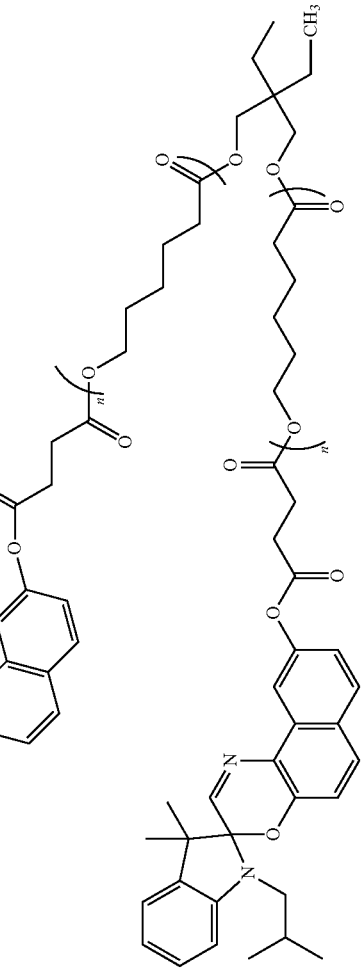 |

TABLE 3.2-continued

Selected example photochromic polymers

| Entry | Pre PC | Photochromic Polymer |
|---|---|---|
| 35 | A | |
| | B | |

TABLE 3.2-continued
Selected example photochromic polymers
| Entry | Pre PC | Photochromic Polymer |
|---|---|---|
| C | | 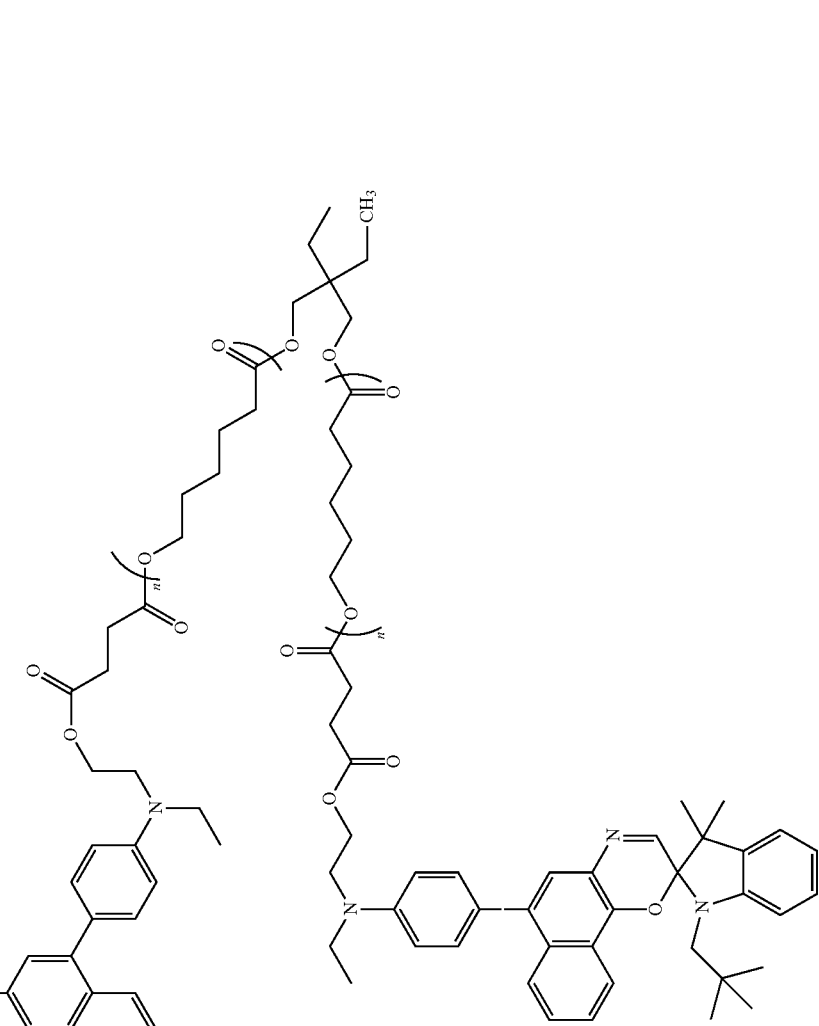 |

TABLE 3.2-continued
Selected example photochromic polymers
| Entry | Pre PC | Photochromic Polymer |
|---|---|---|
| 36 | A | |
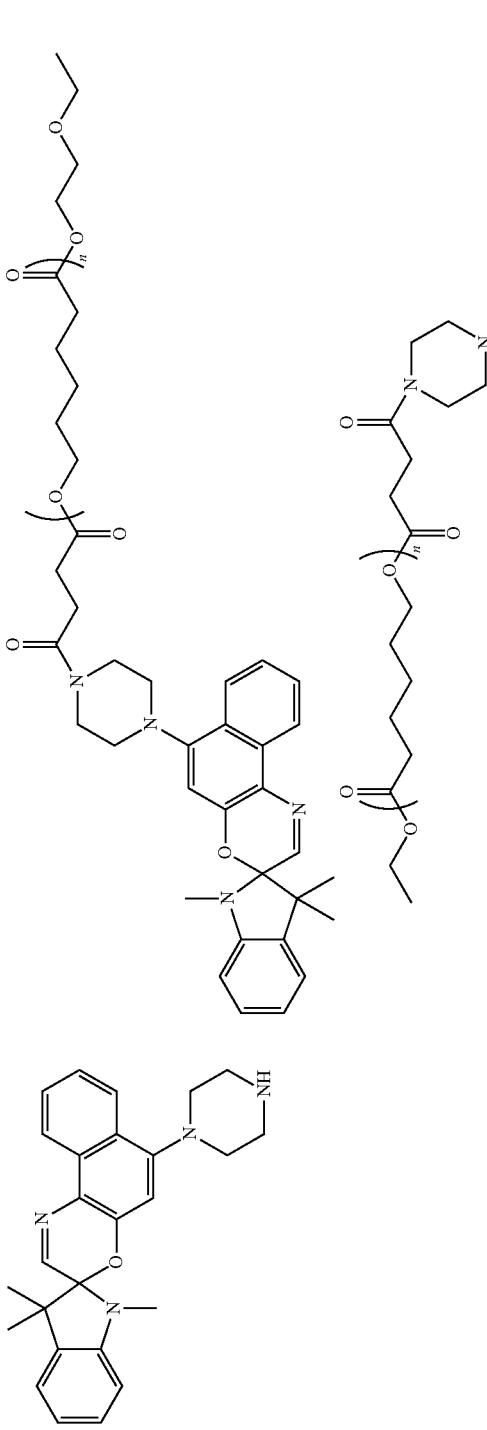

TABLE 3.2-continued
Selected example photochromic polymers
| Entry | Pre PC | Photochromic Polymer |
|---|---|---|
| B | | 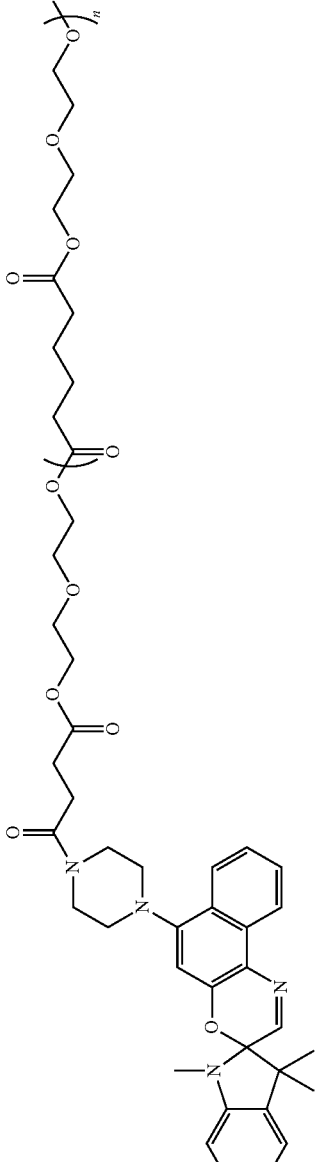 |

TABLE 3.2-continued
Selected example photochromic polymers
| Entry | Pre PC | Photochromic Polymer |
|---|---|---|
| | C | 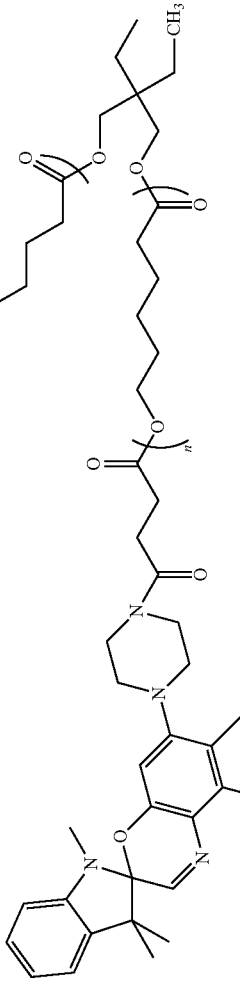 |

The invention claimed is:

1. A photochromic polymer comprising at least two photochromic moieties linked by a straight or branched chain polymer selected from the group consisting of a homo-polyester, a co-polyester, and a co-polyester-polyether.

2. A photochromic polymer according to claim 1, wherein the polymer is poly($C_1$ to $C_{10}$ acyloxy); poly[($C_1$ to $C_{10}$ acyloxy)-co-($C_1$ to $C_{10}$ acyloxy)]; poly(acyloxy)alkoxide; poly[($C_1$ to $C_{10}$ alkylene)-co-($C_1$ to $C_{10}$ acyloxy); poly($C_1$ to $C_{10}$ alkylene)-block-poly($C_1$ to $C_{10}$ acyloxy); poly[($C_1$ to $C_{10}$ alkylene oxide)-co-($C_1$ to $C_{10}$ acyloxy)]; and poly($C_1$ to $C_{10}$ alkylene oxide)-block-poly($C_1$ to $C_{10}$ acyloxy).

3. A photochromic polymer according to claim 1 of formula I:

$$(PC-L^a\text{-}(Q)_n\text{-}L^b)_Z X \quad (I)$$

wherein $(Q)_n$ is a polymer comprising a polyester each independently selected from the group consisting poly($C_1$ to $C_{10}$ acyloxy); poly[($C_1$ to $C_{10}$ acyloxy)-co-($C_1$ to $C_{10}$ acyloxy)]; poly(acyloxy)alkoxide; poly[($C_1$ to $C_{10}$ alkylene)-co-($C_1$ to $C_{10}$ acyloxy); poly($C_1$ to $C_{10}$ alkylene)-block-poly($C_1$ to $C_{10}$ acyloxy); poly[($C_1$ to $C_{10}$ alkylene oxide)-co-($C_1$ to $C_{10}$ acyloxy)]; and poly($C_1$ to $C_{10}$ alkylene oxide)-block-poly($C_1$ to $C_{10}$ acyloxy); and wherein n of $(Q)_n$ is an integer from 1 to 50;

Z is an integer from 2 to 8;

$L^a$ and $L^b$ are each independently a bond or a linker;

PC are independently selected photochromic moieties; and

X is a bond, or a linear or branched hydrocarbon comprising from 1 to 20 carbon atoms or a hydrocarbon ether or polyether of 2, 3 or 4 hydrocarbon units each of 3 to 6 carbon atoms joined through ether linkages and together providing covalent bonds to from 2 to 8 (PC-$L_1$-$(Q)_n$-$L_2)_Z$ units.

4. A photochromic polymer according to claim 3 wherein X is a hydrocarbon of formula:

$$C_m H_{2m+2-Z}$$

wherein m is from 1 to 6 and Z is as defined in claim 3.

5. A photochromic polymer according to claim 3 wherein Z is from 2 to 8 and X is selected from the group consisting of: ethyl, propyl, butyl, pentyl, hexyl, —$(CH_2)_{1\text{-}8}O(CH_2)_{1\text{-}8}$—, wherein Z is 2;

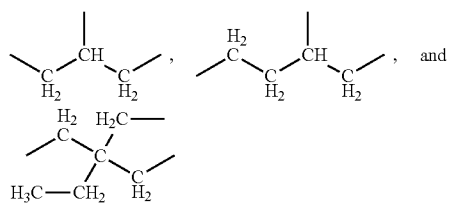

wherein Z is 3; and

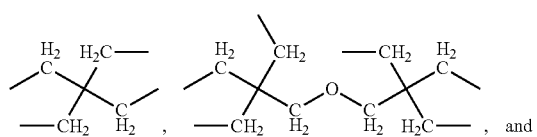

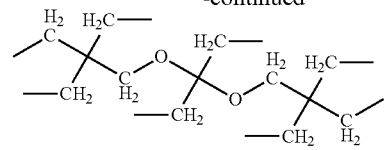

wherein Z is from 4, 6 or 8.

6. A photochromic polymer according to claim 3 wherein the photochromic polymer is of formula IIIa, IIIb or IIIc:

$$PC^1\text{-}L^{a1}\text{-}(Q^1)_{n1}\text{-}L^{b1}\text{-}X^1\text{-}L^{b2}\text{-}(Q^2)_{n2}\text{-}L^{a2}\text{-}PC^2 \quad (IIIa)$$

wherein $X^1$ is selected from the group consisting of ethyl, propyl, butyl, pentyl, hexyl and —$(CH_2)_{1\text{-}8}O(CH_2)_{1\text{-}8}$—;

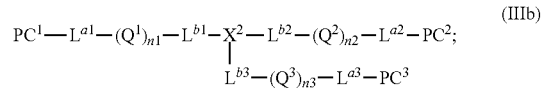

wherein $X^2$ is a linear or branched hydrocarbon of formula $C_m H_{2m\text{-}1}$; wherein m is from 1 to 6; and

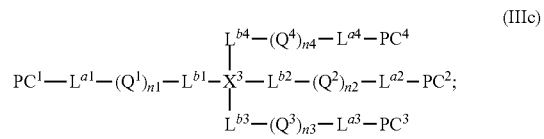

wherein $X^3$ is a linear or branched hydrocarbon of formula $C_m H_{2m\text{-}2}$; wherein m is from 1 to 6;

and wherein $(Q^1)_{n1}$, $(Q^2)_{n2}$, $(Q^3)_{n3}$ and $(Q^4)_{n4}$ are as defined for Q; n1, n2, n3 and n4 of $(Q^1)_{n1}$, $(Q^2)_{n2}$, $(Q^3)_{n3}$ and $(Q^4)_{n4}$, respectively, are each independently an integer from 1 to 50; and $L^{a1}$, $L^{a2}$, $L^{a3}$ and $L^{a4}$ are as defined above for $L^a$;

$L^{b1}$, $L^{b2}$, $L^{b3}$ and $L^{b4}$ are as defined above for $L^b$;

$PC^1$, $PC^2$, $PC^3$ and $PC^4$ is as defined for PC.

7. A photochromic polymer according to claim 6, wherein $$\text{-}(Q^1)_{n1}\text{-}L^{b1}\text{-}X^1\text{-}L^{b2}\text{-}(Q^2)_{n2}\text{-}$$

of formula IIIa is dihydroxy poly(caprolactone) or poly[di(ethylene glycol) adipate].

8. A photochromic polymer according to claim 6, wherein

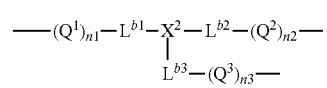

of formula IIIb is poly caprolactone triol.

9. A photochromic polymer according to claim 3 wherein $L^a$ and $L^b$ in formula I may be a bond or a linker; wherein the linker is selected from the group consisting of —$(CH_2)_x$—, —O—, —N($R^4$)—, —S—, —Si—, —C(=O)—, —C(=S)—, —OC(=O)—, —N($R^4$)C(=O)—, —O($CH_2)_x$O—, —OC(=O)—$(CH_2)_x$—C(=O)O—, —OC(=O)—O—C(=O)O— a linear or branched hydrocarbon comprising from 1 to 20 carbon atoms, a hydrocarbon ether or polyether of 2, 3 or 4 hydrocarbon units each of 3 to 6 carbon atoms joined through ether linkages, a hydrocarbon ester or polyester of 2, 3 or 4 hydrocarbon units each of 3 to 6 carbon atoms joined through ester linkages; wherein $R^4$ is H or an alkyl group of 1 to 6 carbon atoms, and x is an integer from 1 to 10.

10. A photochromic polymer according to claim 9, wherein $L^a$ is a group selected from the following formula:

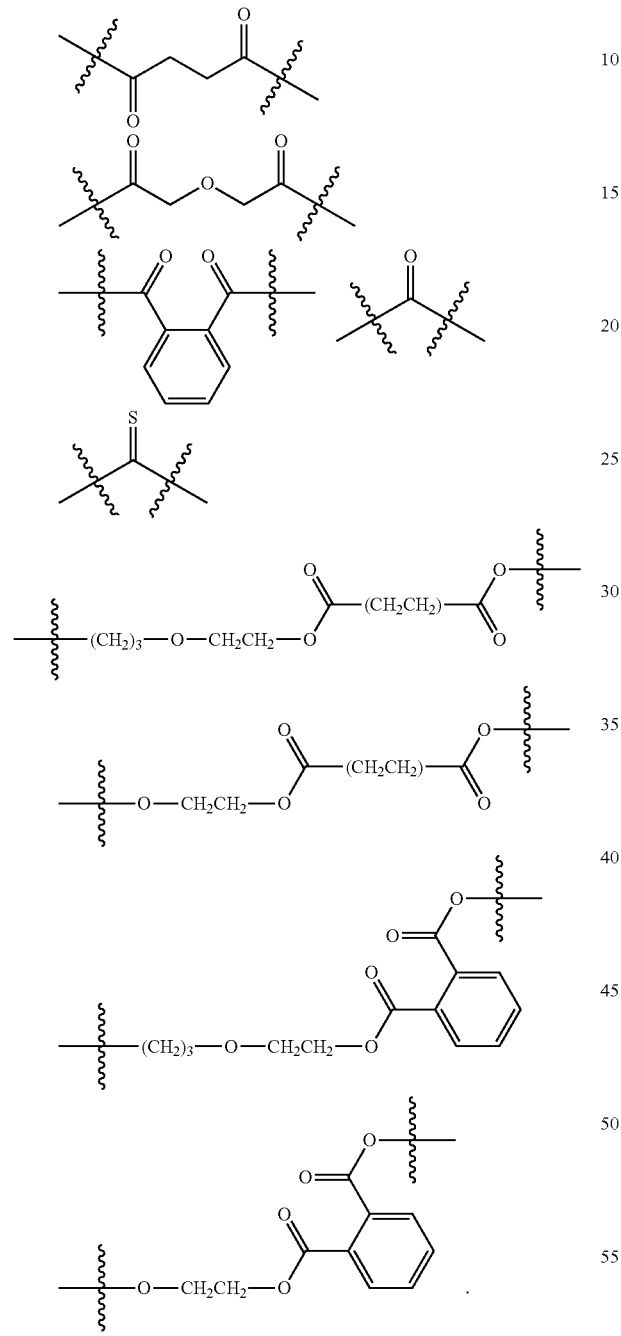

11. A photochromic polymer according to claim 3, wherein the photochromic moieties are independently selected from the group consisting of naphthopyrans, spiropyrans and spirooxazines.

12. A photochromic polymer according to claim 3, wherein the photochromic moieties are independently selected from the moieties of formula IVa to IVd:

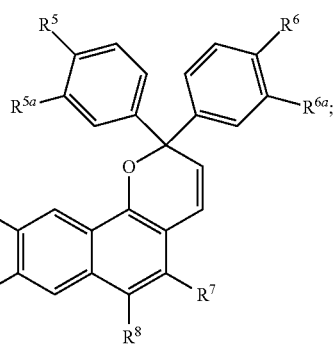
(IVa)

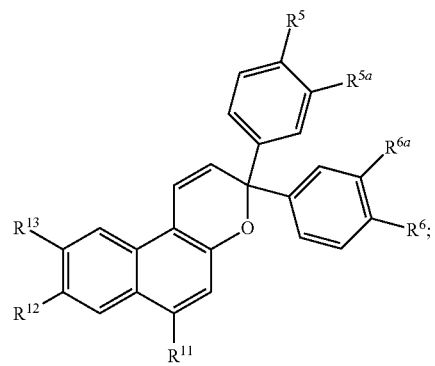
(IVb)

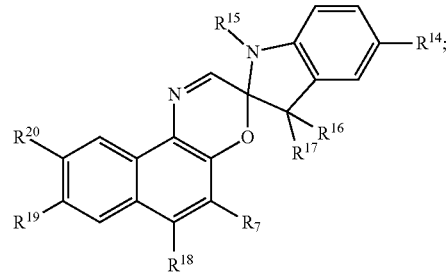
(IVc)

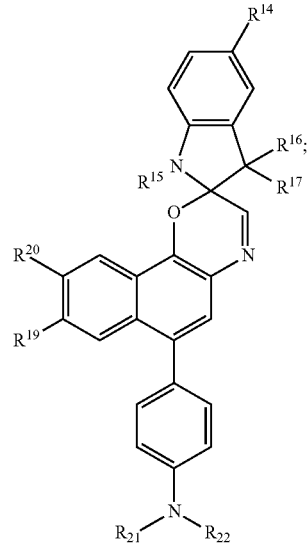
(IVd)

wherein $R^5$ and $R^6$ independently represent hydrogen, $C_{1-10}$ alkyl, $C_{1-10}$ alkoxy, $C_{1-10}$ hydroxyalkoxy, $C_{1-10}$ alkoxy($C_{1-10}$)alkoxy, phenyl, $C_{1-10}$ alkoxyphenyl, halogen, $C_{1-5}$ haloalkyl, $C_{1-5}$ alkylamino, $C_{1-5}$ dialkylamino, arylamino, diarylamino, aryl $C_{1-5}$ alkylamino, or a cyclic amino group;

$R^{5a}$ and $R^{6a}$ are hydrogen or together with $R^5$ and $R^6$ respectively may form a carbocyclic or heterocyclic ring of 5 or 6 constituent ring members and optionally up to two heteroatoms selected from oxygen, sulfur and —N($R^{27}$)— wherein $R^{27}$ is selected from hydrogen and $C_{1-10}$ alkyl;

$R^7$ represents hydrogen, $C_{1-10}$ alkyl, up to $C_{20}$ cycloalkyl, up to $C_{20}$ bicycloalkyl, $C_{2-10}$ alkenyl, $C_{1-10}$ alkoxy, $C_{1-10}$ hydroxyalkyl, $C_{1-10}$ alkoxy($C_{1-10}$)alkyl, $C_{1-10}$ aminoalkyl, $C_{1-20}$ alkoxycarbonyl, carboxyl, halogen, aryloxycarbonyl, formyl, acetyl or aroyl;

$R^8$ represents, phenyl, $C_{1-10}$ alkoxyphenyl, $C_{1-10}$ dialkoxyphenyl, $C_{1-10}$ alkylphenyl, $C_{1-10}$ dialkylphenyl or one of the groups specified for $R^7$; or $R^7$ and $R^8$ together form a cyclic structure of the type

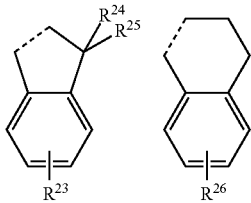

$R^9$, $R^{10}$, $R^{11}$, $R^{12}$, $R^{13}$, $R^{14}$, $R^{16}$, $R^{17}$, $R^{18}$, $R^{19}$, $R^{20}$, $R^{23}$, $R^{24}$, $R^{25}$ and $R^{26}$ are as defined for $R^5$ and $R^6$; and $R^{15}$, $R^{21}$ and $R^{22}$ represents linear or branched $C_{1-10}$ alkyl, $C_{1-10}$ hydroxyalkyl, or together form a $C_{5-7}$ ring.

13. A photochromic polymer of formula 1 according to claim 3 wherein the photochromic moieties (PC) are independently selected from the group consisting of
1,3-dihydro-3,3-dimethyl-1-neopentyl-6'-(4"-N-ethyl, N-(hydroxylethyl)anilino)spiro[2H-indole-2,3'-3H-naphtho[1,2-b][1,4]oxazine;
3-(4'-methoxyphenyl),3-(4"-(hydroxyethoxy)phenyl)-6-morpholino-3Hnaphtho[2,1-b]pyran;
3-(4'-methoxyphenyl),3-(4"-(hydroxyethoxy)phenyl)-6-morpholino-3Hnaphtho[2,1-b]pyran;
1,3-dihydro-3,3-dimethyl-1-isobutyl-9'-hydroxy-sprio[2H-indole-2,3'-3Hnaphtho[2,1-b][1,4]oxazine;
2-(4'-pyrrolidinophenyl)-2-phenyl-5-hydroxymethyl-6-anisyl-9-methoxy-2Hnaphtho[1,2-b]pyran;
2,2-bis(4'-methoxyphenyl)-5-hydroxymethyl-6-methyl-2H-naphthol[1,2-b]pyran;
(2-(4'-pyrrolidinophenyl)-2-phenyl-5-hydroxymethyl-6-anisyl-9-methoxy-2Hnaphtho[1,2-b]pyran;
3-phenyl-3-(4'-(hydroxyethoxy)phenyl)-6-morpholino-3H-naphtho[2,1-b]pyran;
1,3-dihydro-3,3-dimethyl-1-neopentyl-9'-hydroxy-spiro[2H-indole-2,3'-3Hnaphthol[2,1-b][1,4]oxazine]; and
2,2-Bis(4'-methoxyphenyl)-5-hydroxymethyl-6-methyl-2H-naphtho[1,2-b]pyran.

14. A photochromic polymer according to claim 3, wherein the molecular weight of the polymer is in the range of 200 to 10,000.

15. A photochromic polymer according to claim 3, wherein the glass transition temperature is less than 25° C.

16. A photochromic polymeric composition comprising a photochromics polymer according to claim 1 and a host polymer.

17. A photochromic polymeric composition according to claim 16 which is free from polydialkylsiloxane polymer.

18. A photochromic lens comprising a photochromic polymeric composition according to claim 16.

19. A photochromic polymer according to claim 3 wherein X is linear or branched hydrocarbon of from 2 to 6 carbon atoms.

20. A photochromic polymer of claim 6 wherein $X^2$ is selected from:

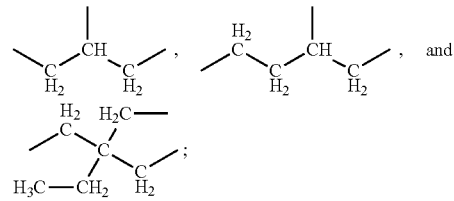

and $X^3$ is selected from:

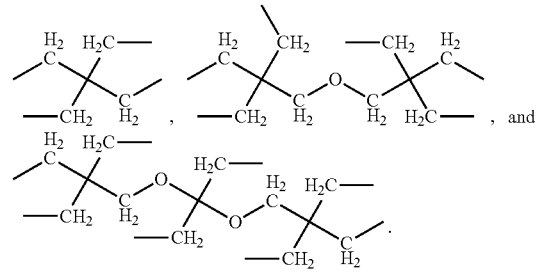

* * * * *